(12) United States Patent
Tsai et al.

(10) Patent No.: US 12,019,365 B2
(45) Date of Patent: Jun. 25, 2024

(54) VARIABLE APERTURE MODULE, IMAGING LENS MODULE AND ELECTRONIC DEVICE

(71) Applicant: LARGAN PRECISION CO., LTD., Taichung (TW)

(72) Inventors: Chia-Cheng Tsai, Taichung (TW); Hsiu-Yi Hsiao, Taichung (TW); Ming-Ta Chou, Taichung (TW); Te-Sheng Tseng, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 17/991,728

(22) Filed: Nov. 21, 2022

(65) Prior Publication Data
US 2024/0103342 A1    Mar. 28, 2024

Related U.S. Application Data

(60) Provisional application No. 63/409,122, filed on Sep. 22, 2022.

(51) Int. Cl.
*G03B 7/085* (2021.01)
*G03B 9/06* (2021.01)

(52) U.S. Cl.
CPC .............. *G03B 7/085* (2013.01); *G03B 9/06* (2013.01)

(58) Field of Classification Search
CPC .................................. G03B 9/06; G03B 7/085
See application file for complete search history.

(56) References Cited

U.S. PATENT DOCUMENTS

| 10,812,692 | B2 | 10/2020 | Kim |
| 10,969,653 | B2 | 4/2021 | Kim et al. |

(Continued)

FOREIGN PATENT DOCUMENTS

| CN | 110858870 B | 7/2021 |
| CN | 110858048 B | 11/2021 |

(Continued)

OTHER PUBLICATIONS

European Search Report dated Aug. 31, 2023 in application No. 22210996.9.

(Continued)

*Primary Examiner* — Christopher E Mahoney
(74) *Attorney, Agent, or Firm* — Maschoff Brennan

(57) ABSTRACT

A variable aperture module includes a blade assembly, a positioning element, a driving part and pressing structures. The blade assembly includes movable blades disposed around an optical axis to form a light passable hole with an adjustable size. Each movable blade has a positioning hole and a movement hole adjacent thereto. The positioning element includes positioning structures disposed respectively corresponding to the positioning holes. The driving part includes a rotation element disposed corresponding to the movement holes and is rotatable with respect to the positioning element. The pressing structures are disposed respectively corresponding to the movable blades. Each pressing structure is at least disposed into at least one of the positioning hole and the movement hole of the corresponding movable blade. Each pressing structure at least presses against at least one of the corresponding one positioning structure and the rotation element.

22 Claims, 25 Drawing Sheets

(56) References Cited

U.S. PATENT DOCUMENTS

| | | | |
|---|---|---|---|
| 11,435,647 B2 * | 9/2022 | Tamiya | ................... B32B 7/12 |
| 2021/0096445 A1 | 4/2021 | Zhu | |
| 2021/0200060 A1 | 7/2021 | Endo | |

FOREIGN PATENT DOCUMENTS

| | | | |
|---|---|---|---|
| CN | 113885269 A | 1/2022 | |
| CN | 114285242 A | 4/2022 | |
| CN | 217133471 U | 8/2022 | |
| JP | 2015079200 A | 4/2015 | |
| TW | 201303481 A | 1/2013 | |
| WO | 2022090491 A1 | 5/2022 | |

OTHER PUBLICATIONS

TW Office Action dated Jul. 13, 2023 as received in Application No. 111138116.

* cited by examiner

VARIABLE APERTURE MODULE, IMAGING LENS MODULE AND ELECTRONIC DEVICE

RELATED APPLICATIONS

This application claims priority to U.S. Provisional Application 63/409,122, filed on Sep. 22, 2022, which is incorporated by reference herein in its entirety.

BACKGROUND

Technical Field

The present disclosure relates to a variable aperture module, an imaging lens module and an electronic device, more particularly to a variable aperture module and an imaging lens module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Recently, camera modules are applied to electronic devices in more fields than ever, such as portable devices (e.g., smartphones, action cameras), augmented reality (AR) or virtual reality (VR) head-mounted devices and aerial cameras. Moreover, the hardware used in the camera modules are continuously upgraded, for example, larger image sensors and imaging lenses with better image quality. A larger image sensor provides better image quality, but the background in the picture may become blurry due to an overly shallow depth of field. Conventionally, a variable aperture assembly can be used to change the depth of field for adjusting the blur degree of the background and controlling the amount of incident light, such that arranging a variable aperture assembly in an optical system of an electronic device becomes a forward-looking subject. However, the blade of the conventional variable aperture assembly may be in the hysteresis state during its rotation, thereby causing the difference between the actual value and the theoretical value of the aperture size of the optical system and therefore generating unexpected imaging effect. Therefore, how to improve the structure of a variable aperture module for meeting the requirement of high-end-specification electronic devices is an important topic in this field nowadays.

SUMMARY

According to one aspect of the present disclosure, a variable aperture module includes a blade assembly, a positioning element, a driving part, and a plurality of pressing structures. The blade assembly includes a plurality of movable blades disposed around an optical axis to form a light passable hole with an adjustable size for different hole size states. Each of the plurality of movable blades has a positioning hole and a movement hole adjacent to the positioning hole. The positioning element includes a plurality of positioning structures disposed respectively corresponding to the positioning holes of the plurality of movable blades so as to position the plurality of movable blades. The driving part includes a rotation element disposed corresponding to the movement holes of the plurality of movable blades and rotatable with respect to the positioning element so as to drive the plurality of movable blades to rotate with respect to the plurality of positioning structures of the positioning element for adjusting a size of the light passable hole. The plurality of pressing structures are disposed respectively corresponding to the plurality of movable blades. Each of the plurality of pressing structures is at least disposed into at least one of the positioning hole and the movement hole of corresponding one among the plurality of movable blades, and each of the plurality of pressing structures at least presses against at least one of corresponding one among the plurality of positioning structures and the rotation element.

According to another aspect of the present disclosure, an imaging lens module includes the aforementioned variable aperture module and an imaging lens, wherein the variable aperture module and the imaging lens are sequentially disposed along the optical axis from an object side to an image side, and light enters into the imaging lens via the light passable hole of the variable aperture module.

According to further another aspect of the present disclosure, an electronic device includes the aforementioned imaging lens module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
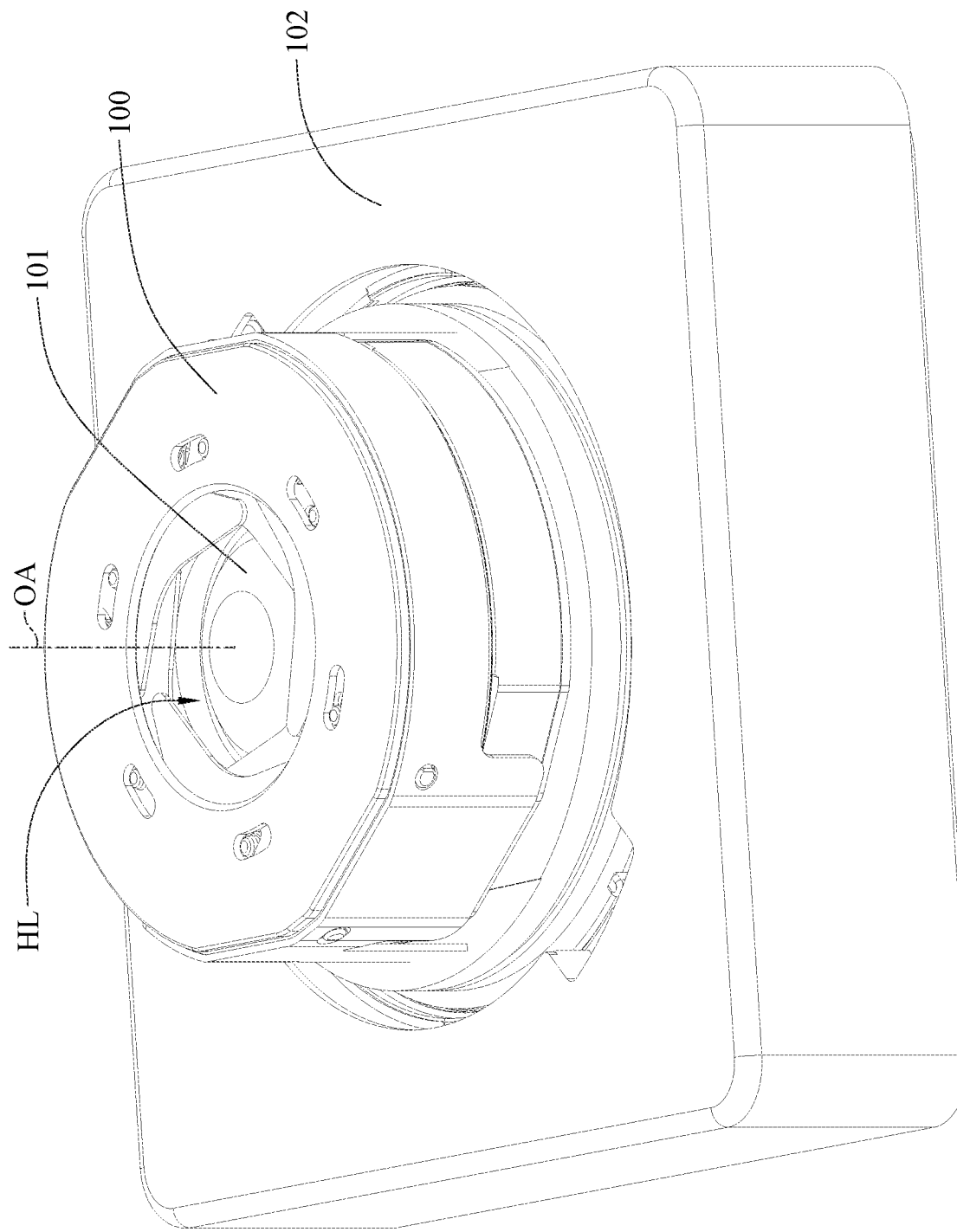
FIG. 1 is a perspective view of an imaging lens module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens module that includes a variable aperture module and an imaging lens. The variable aperture module and the imaging lens are sequentially disposed along an optical axis from an object side to an image side.

The variable aperture module includes a blade assembly, a positioning element, a driving part and a plurality of pressing structures.

The blade assembly includes a plurality of movable blades that are disposed around the optical axis to form a light passable hole with an adjustable size for different hole size states. Moreover, light enters into the imaging lens via the light passable hole of the variable aperture module. Each movable blade has a positioning hole and a movement hole adjacent to the positioning hole.

The positioning element includes a plurality of positioning structures that are disposed respectively corresponding to the positioning holes of the plurality of movable blades so as to position the plurality of movable blades. Moreover, each positioning structure can be a structure of the positioning element extending along a direction parallel to the optical axis. By designing the positioning structure as an upwardly or downwardly protruded structure, it is favorable for accurately controlling the size of the light passable hole.

The driving part includes a rotation element. The rotation element can include a plurality of rotation structures that can be disposed respectively corresponding to the movement holes of the plurality of movable blades and can be movable in respective movement holes. The rotation element is rotatable with respect to the positioning element so as to drive the movable blades to rotate with respect to the positioning structures of the positioning element for adjusting the size of the light passable hole. Moreover, each rotation structure can be a structure of the rotation element extending along a direction parallel to the optical axis. Therefore, it is favorable for accurately controlling the size of the light passable hole.

In each movable blade, one pressing structure is at least disposed into at least one of the positioning hole and the movement hole of the movable blade, and at least press against at least one of the positioning structure and the rotation element. Moreover, in each movable blade, the corresponding pressing structure can be disposed at a side of the positioning hole or a side of the movement hole. Therefore, it is favorable for increasing stability of manufacturing. Moreover, each movable blade can further has an inner surface and an outer surface at the movement hole thereof, the inner surface can be located closer to the positioning hole than the outer surface, and the corresponding pressing structure can be disposed on at least one of the inner surface and the outer surface. Therefore, it is favorable for determining the positon of the pressing structure depending on the convenience of manufacturing so as to increase production efficiency. Alternatively, in each movable blade, the corresponding pressing structure can be circumferentially disposed into the positioning hole or the movement hole. Therefore, it is favorable for increasing stability of the overall structure. Moreover, each movable blade and the corresponding pressing structure disposed thereon can be made in one piece. Therefore, it is favorable for simplifying the assembly process so as to increase production efficiency.

With the arrangement of the pressing structures, it is favorable for reducing the backlashes between the movable blades and the positioning structures or between the movable blades and the rotation element and thus accurately controlling the positions of the movable blades, thereby reducing influence caused by hysteresis of the movable blades and reducing the aperture size difference between the actual value and the theoretical value. Moreover, by disposing the rotation structures to correspond to the movement holes of the movable blades, it is favorable for further accurately controlling the size of the light passable hole.

Each movable blade can include a first surface layer, a second surface layer and an inner substrate layer. The inner substrate layer can be located between the first surface layer and the second surface layer. By designing the movable blade in the form of composite materials, it is favorable for meeting the requirement of thinness manufacturing. Moreover, in each movable blade, the first surface layer and the second surface layer can be located closer to the center of the light passable hole than the inner substrate layer. By designing the movable blade as a multi-layer structure, it is favorable for reducing reflection of diffuse light. Please refer to FIG. 12 and FIG. 13, which show the movable blade 211 according to the 2nd embodiment of the present disclosure, wherein the inner substrate layer 2115 is located between the first surface layer 2113 and the second surface layer 2114, and the first surface layer 2113 and the second surface layer 2114 are located closer to the center CT of the light passable hole HL than the inner substrate layer 2115.

The driving part can further include a magnet and a coil. The magnet and the coil can be disposed corresponding to each other, and one of the magnet and the coil can be disposed on the rotation element. Therefore, the interaction force generated by the magnet and the coil is favorable for driving the rotation element to move with respect to the positioning element.

The driving part can further include a base. The rotation element can be disposed on the base along a direction parallel to the optical axis. The supporting force provided by the base is sufficient for supporting the rotation element and therefore is favorable for securing the structural strength of the variable aperture module and achieving mass production conditions.

The driving part can further include at least two bearing members that can be disposed either between the rotation element and the positioning element or between the rotation element and the base along a direction parallel to the optical axis so as to support rotational motion of the rotation element. Therefore, it is favorable for increasing stability of rotational motion of the rotation element. Moreover, the number of the bearing members can be five or less. Therefore, it is favorable for maintaining manufacturing yield rate. Moreover, each bearing member can be spherical, and all bearing members can be aligned on the same plane with respect to the optical axis. Therefore, it is favorable for further securing stability of rotational motion of the rotation element.

Each bearing member can have a plurality of contact points that can be in physical contact with the rotation element, the positioning element or the base. The contact points can have an inner contact point, an outer contact point, an upper contact point and a lower contact point. The inner contact point can be located closer to the optical axis than the other contact points. The outer contact point can be located farther away from the optical axis than the other contact points. The upper contact point can be one of two contact points that are most spaced apart from each other in a direction parallel to the optical axis among all contact points. The lower contact point can be the other one of the two contact points that are most spaced apart from each other in the direction parallel to the optical axis among all contact points. With the arrangement of contact points, it is favorable for performing alignment either between the rotation element and the positioning element or between the rotation element and the base so as to maintain the positions thereof during the rotational motion of the rotation element. Specifically, the alignment through the inner contact point and the outer contact point helps to maintain the radial positions either between the rotation element and the positioning element or between the rotation element and the base, and the alignment through the upper contact point and the lower contact point helps to maintain the axial positions either between the rotation element and the positioning element or between the rotation element and the base. Moreover, the number of all contact points can be four. Alternatively, the number of all contact points can be three. When the number of all contact points is three, one of the inner contact point and the outer contact point and one of the upper contact point and the lower contact point among all contact points can be the same contact point.

When a distance perpendicular to the optical axis between the inner contact point and the outer contact point is Dt, and a distance perpendicular to the optical axis between the inner contact point and the remaining contact point among all contact points is Di, the following condition can be satisfied: $0.3 \leq Di/Dt \leq 0.7$. Therefore, it is favorable for balancing the force applied on the rotation element so as to ensure dynamic stability of elements during the rotational motion of the rotation element. Please be noted that the definition of "the remaining contact point" in Di is the lower contact point when the number of all contact points is four; the definition of "the remaining contact point" in Di is a contact point instead of the abovementioned inner and outer contact points, which may be the upper contact point or the lower contact point, when the number of all contact points is three. Please refer to FIG. 28, which shows Dt and Di according to the 1st embodiment of the present disclosure.

Figure 28:
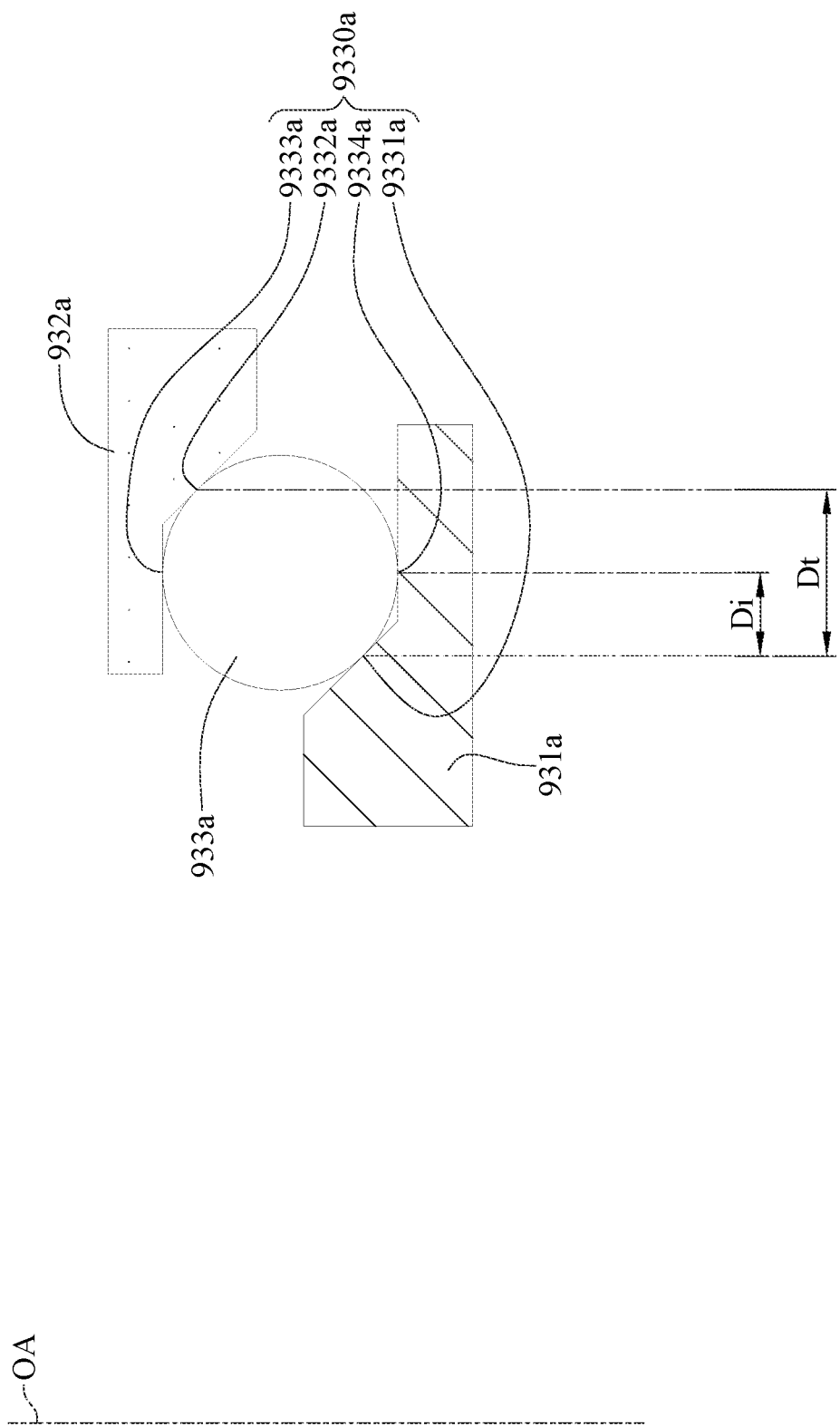
FIG. 28 is a schematic view showing the correspondence relationship of several components of an imaging lens module according to one embodiment of the present disclosure.

Taking the arrangement of the bearing member disposed between the rotation element and the base as an example, there are various manners of physical contact of the bearing members with the rotation element and the base. The manners of physical contact of the bearing members and the rotation element and the base through contact points according to a plurality of embodiments of the present disclosure will be illustrated hereinafter. Please refer to FIG. 28, which is a schematic view showing the correspondence relationship of several components of an imaging lens module according to one embodiment of the present disclosure. As shown in FIG. 28, the spherical bearing member 933a is disposed between the rotation element 932a and the base 931a. The bearing member 933a has a plurality of contact points 9330a that are in physical contact with the rotation element 932a and the base 931a. The contact points 9330a has four contact points, which are an inner contact point 9331a, an outer contact point 9332a, an upper contact point 9333a and a lower contact point 9334a. The inner contact point 9331a is located closer to the optical axis OA than the other contact points and is in physical contact with the base 931a at the lower left side of the bearing member 933a depicted in FIG. 28. The outer contact point 9332a is located farther away from the optical axis OA than the other contact points and is in physical contact with the rotation element 932a at the upper right side of the bearing member 933a depicted in FIG. 28. The upper contact point 9333a is one of two contact points that are most spaced apart from each other in a direction parallel to the optical axis OA among the contact points 9330a and is in physical contact with the rotation element 932a at the upper side of the bearing member 933a depicted in FIG. 28. The lower contact point 9334a is the other one of the two contact points that are most spaced apart from each other in the direction parallel to the optical axis OA among the contact points 9330a and is in physical contact with the base 931a at the lower side of the bearing member 933a depicted in FIG. 28.

When a distance perpendicular to the optical axis OA between the inner contact point 9331a and the outer contact point 9332a is Dt, and a distance perpendicular to the optical axis OA between the inner contact point 9331a and the lower contact point 9334a is Di, the following condition is satisfied: Di/Dt=0.5.

Figure 29:
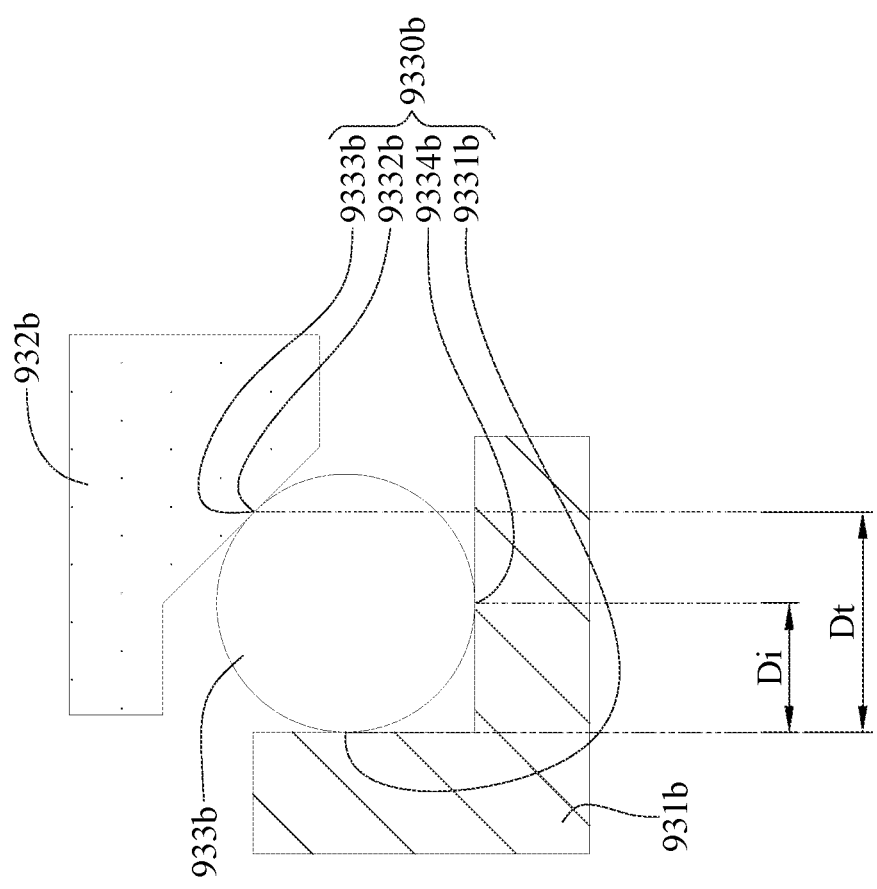
FIG. 29 is a schematic view showing the correspondence relationship of several components of an imaging lens module according to another embodiment of the present disclosure.

Please refer to FIG. 29, which is a schematic view showing the correspondence relationship of several components of an imaging lens module according to another embodiment of the present disclosure. As shown in FIG. 29, the spherical bearing member 933b is disposed between the rotation element 932b and the base 931b. The bearing member 933b has a plurality of contact points 9330b that are in physical contact with the rotation element 932b and the base 931b. The contact points 9330b has three contact points, which are an outer contact point 9332b and an upper contact point 9333b as the same contact point, an inner contact point 9331b and a lower contact point 9334b. The inner contact point 9331b is located closer to the optical axis OA than the other contact points and is in physical contact with the base 931b at the left side of the bearing member 933b depicted in FIG. 29. The outer contact point 9332b, or the upper contact point 9333b, is one of two contact points that are most spaced apart from each other in a direction parallel to the optical axis OA among the contact points 9330b and is in physical contact with the rotation element 932b at the upper right side of the bearing member 933b depicted in FIG. 29. The lower contact point 9334b is the other one of the two contact points that are most spaced apart from each other in the direction parallel to the optical axis OA among the contact points 9330b and is in physical contact with the base 931b at the lower side of the bearing member 933b depicted in FIG. 29.

When a distance perpendicular to the optical axis OA between the inner contact point 9331b and the outer contact point 9332b is Dt, and a distance perpendicular to the optical axis OA between the inner contact point 9331b and the lower contact point 9334b is Di, the following condition is satisfied: Di/Dt=0.59.

Figure 30:
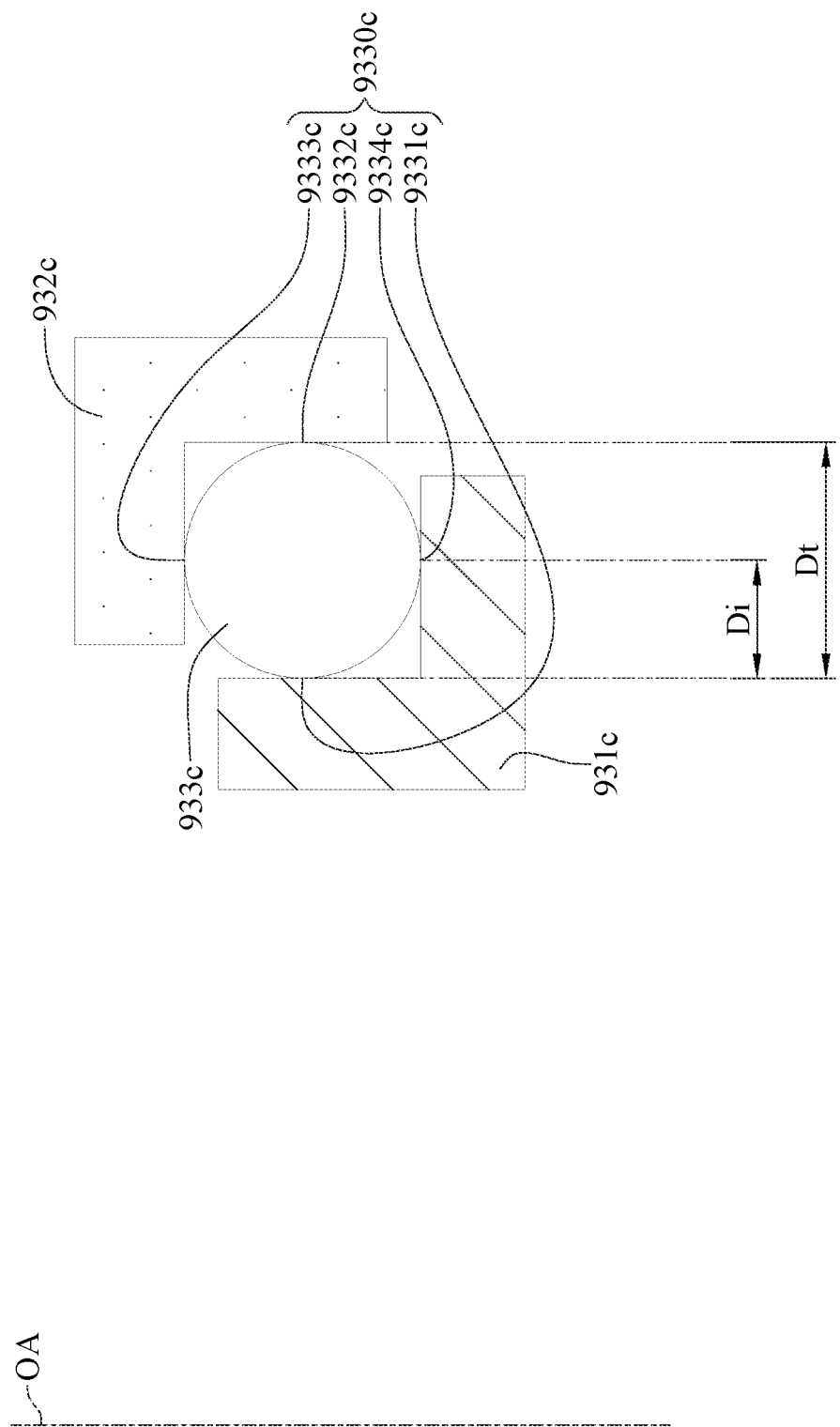
FIG. 30 is a schematic view showing the correspondence relationship of several components of an imaging lens module according to further another embodiment of the present disclosure.

Please refer to FIG. 30, which is a schematic view showing the correspondence relationship of several components of an imaging lens module according to further another embodiment of the present disclosure. As shown in FIG. 30, the spherical bearing member 933c is disposed between the rotation element 932c and the base 931c. The bearing member 933c has a plurality of contact points 9330c that are in physical contact with the rotation element 932c and the base 931c. The contact points 9330c has four contact points, which are an inner contact point 9331c, an outer contact point 9332c, an upper contact point 9333c and a lower contact point 9334c. The inner contact point 9331c is located closer to the optical axis OA than the other contact points and is in physical contact with the base 931c at the left side of the bearing member 933c depicted in FIG. 30. The outer contact point 9332c is located farther away from the optical axis OA than the other contact points and is in physical contact with the rotation element 932c at the right side of the bearing member 933c depicted in FIG. 30. The upper contact point 9333c is one of two contact points that are most spaced apart from each other in a direction parallel to the optical axis OA among the contact points 9330c and is in physical contact with the rotation element 932c at the upper side of the bearing member 933c depicted in FIG. 30. The lower contact point 9334c is the other one of the two contact points that are most spaced apart from each other in the direction parallel to the optical axis OA among the contact points 9330c and is in physical contact with the base 931c at the lower side of the bearing member 933c depicted in FIG. 30.

When a distance perpendicular to the optical axis OA between the inner contact point 9331c and the outer contact point 9332c is Dt, and a distance perpendicular to the optical axis OA between the inner contact point 9331c and the lower contact point 9334c is Di, the following condition is satisfied: Di/Dt=0.5.

Figure 31:
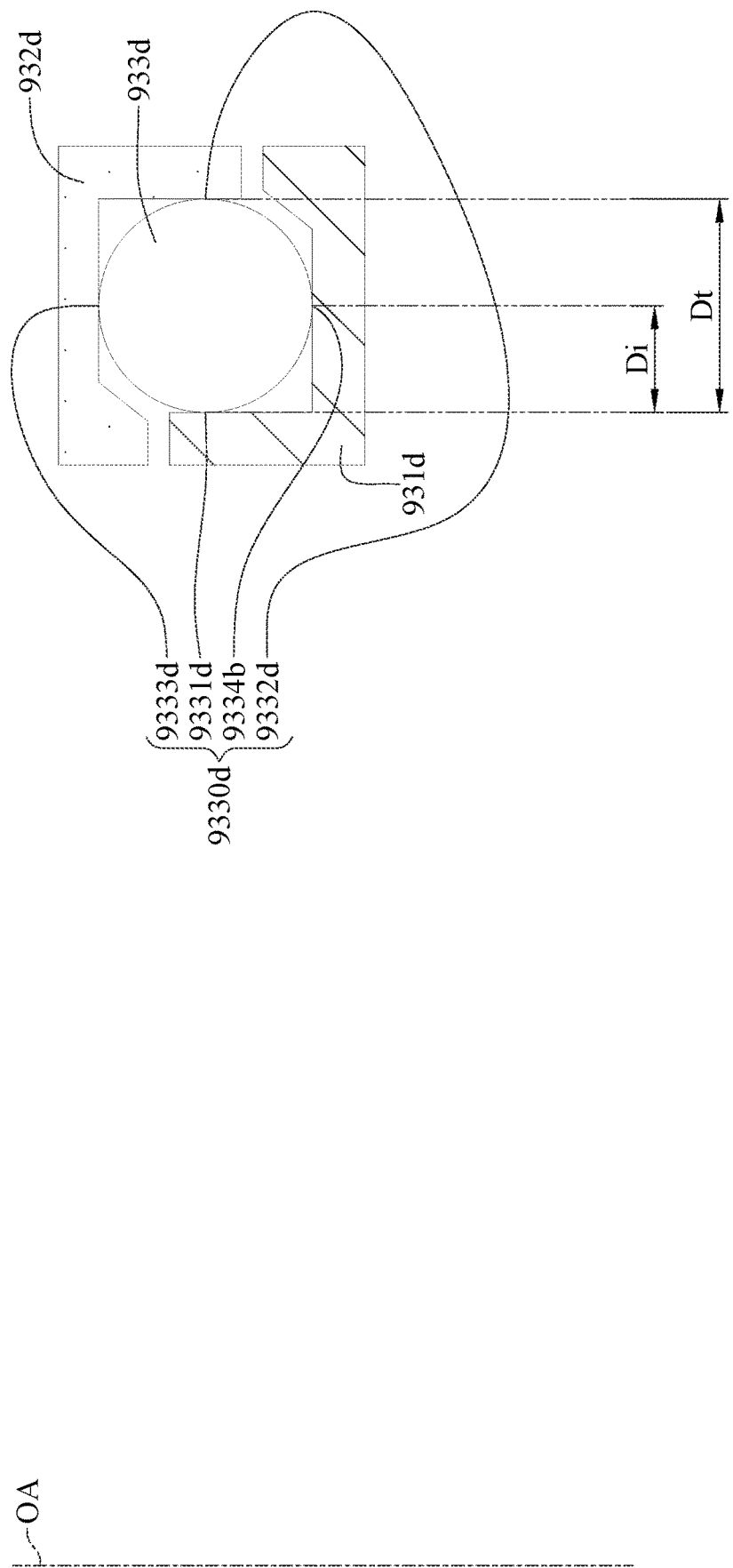
FIG. 31 is a schematic view showing the correspondence relationship of several components of an imaging lens module according to still another embodiment of the present disclosure.

Please refer to FIG. 31, which is a schematic view showing the correspondence relationship of several components of an imaging lens module according to still another embodiment of the present disclosure. As shown in FIG. 31, the spherical bearing member 933d is more covered and disposed between the rotation element 932d and the base 931d. The bearing member 933d has a plurality of contact points 9330d that are in physical contact with the rotation element 932d and the base 931d. The contact points 9330d has four contact points, which are an inner contact point 9331d, an outer contact point 9332d, an upper contact point 9333d and a lower contact point 9334d. The inner contact point 9331d is located closer to the optical axis OA than the other contact points and is in physical contact with the base 931d at the left side of the bearing member 933d depicted in FIG. 31. The outer contact point 9332d is located farther away from the optical axis OA than the other contact points and is in physical contact with the rotation element 932d at the right side of the bearing member 933d depicted in FIG. 31. The upper contact point 9333d is one of two contact points that are most spaced apart from each other in a direction parallel to the optical axis OA among the contact points 9330d and is in physical contact with the rotation element 932d at the upper side of the bearing member 933d depicted in FIG. 31. The lower contact point 9334d is the other one of the two contact points that are most spaced apart from each other in the direction parallel to the optical axis OA among the contact points 9330d and is in physical contact with the base 931d at the lower side of the bearing member 933d depicted in FIG. 31.

When a distance perpendicular to the optical axis OA between the inner contact point 9331d and the outer contact point 9332d is Dt, and a distance perpendicular to the optical axis OA between the inner contact point 9331d and the lower contact point 9334d is Di, the following condition is satisfied: Di/Dt=0.5.

Figure 32:
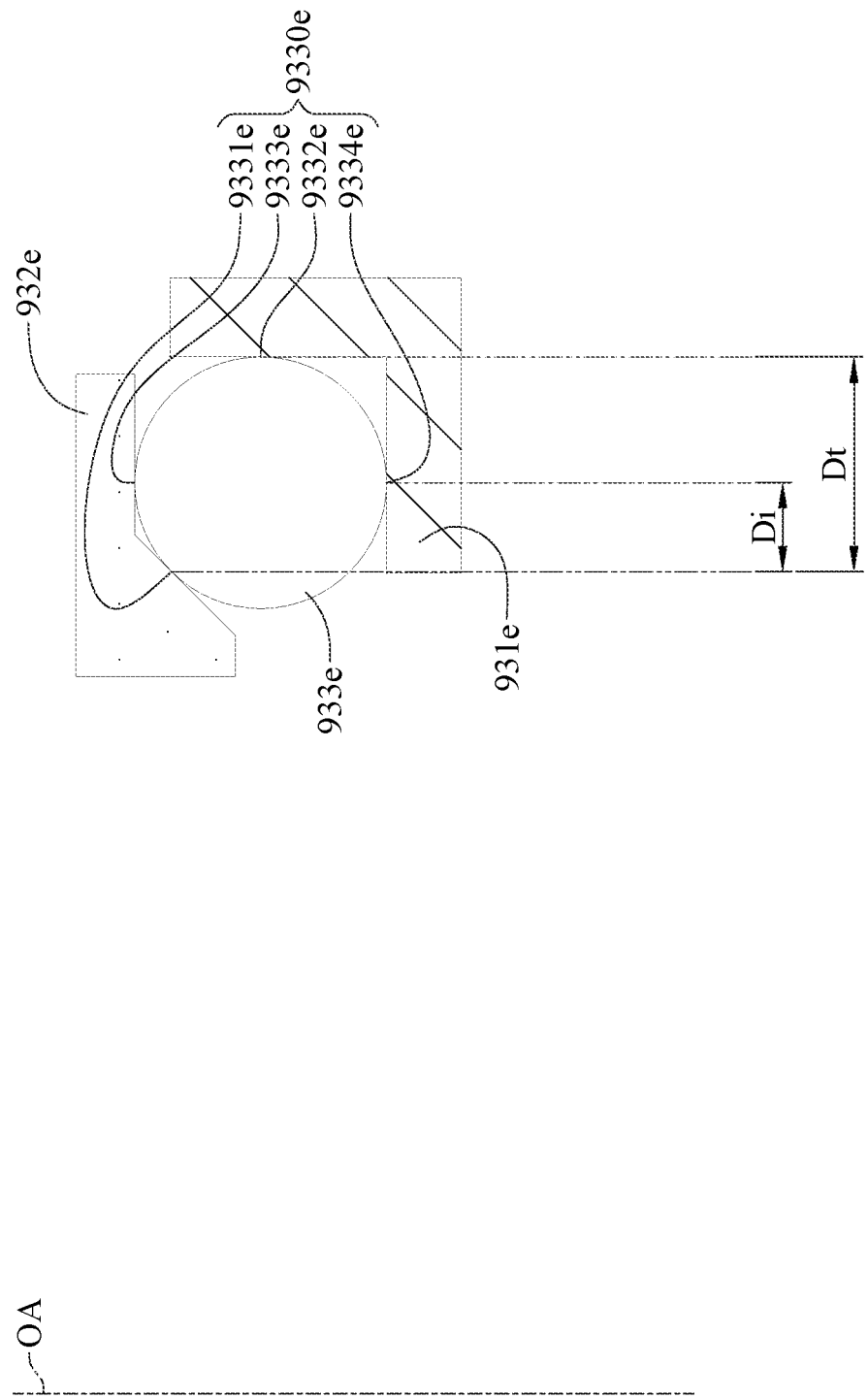
FIG. 32 is a schematic view showing the correspondence relationship of several components of an imaging lens module according to still further another embodiment of the present disclosure.

Please refer to FIG. 32, which is a schematic view showing the correspondence relationship of several components of an imaging lens module according to still further another embodiment of the present disclosure. As shown in FIG. 32, the spherical bearing member 933e is disposed between the rotation element 932e and the base 931e. The bearing member 933e has a plurality of contact points 9330e that are in physical contact with the rotation element 932e and the base 931e. The contact points 9330e has four contact points, which are an inner contact point 9331e, an outer contact point 9332e, an upper contact point 9333e and a lower contact point 9334e. The inner contact point 9331e is located closer to the optical axis OA than the other contact points and is in physical contact with the rotation element 932e at the upper left side of the bearing member 933e depicted in FIG. 32. The outer contact point 9332e is located farther away from the optical axis OA than the other contact points and is in physical contact with the base 931e at the right side of the bearing member 933e depicted in FIG. 32. The upper contact point 9333e is one of two contact points that are most spaced apart from each other in a direction parallel to the optical axis OA among the contact points 9330e and is in physical contact with the rotation element 932e at the upper side of the bearing member 933e depicted in FIG. 32. The lower contact point 9334e is the other one of the two contact points that are most spaced apart from each other in the direction parallel to the optical axis OA among the contact points 9330e and is in physical contact with the base 931e at the lower side of the bearing member 933e depicted in FIG. 32.

When a distance perpendicular to the optical axis OA between the inner contact point 9331e and the outer contact point 9332e is Dt, and a distance perpendicular to the optical axis OA between the inner contact point 9331e and the lower contact point 9334e is Di, the following condition is satisfied: Di/Dt=0.41.

Please be noted that FIG. 28 to FIG. 32 are schematically illustrated for better showing the physical contact relationship of the contact points with adjacent elements, and the contours of the adjacent elements may not in compliance with the actual production.

The imaging lens disclosed in the present disclosure can have an f-number. When the f-number is FNO, the following condition can be satisfied: $0.9 \leq FNO \leq 5.6$. By changing the size of the light passable hole, it is favorable for making the f-number of the imaging lens module to be applicable to different photographing scenarios.

The imaging lens disclosed in the present disclosure can have a maximum field of view. When the maximum field of view is FOV, the following condition can be satisfied: $50 [deg.] \leq FOV \leq 105 [deg.]$. Therefore, it is favorable for making the size of the light passable hole to be controllable.

The present disclosure also provides an electronic device that includes the abovementioned imaging lens module.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
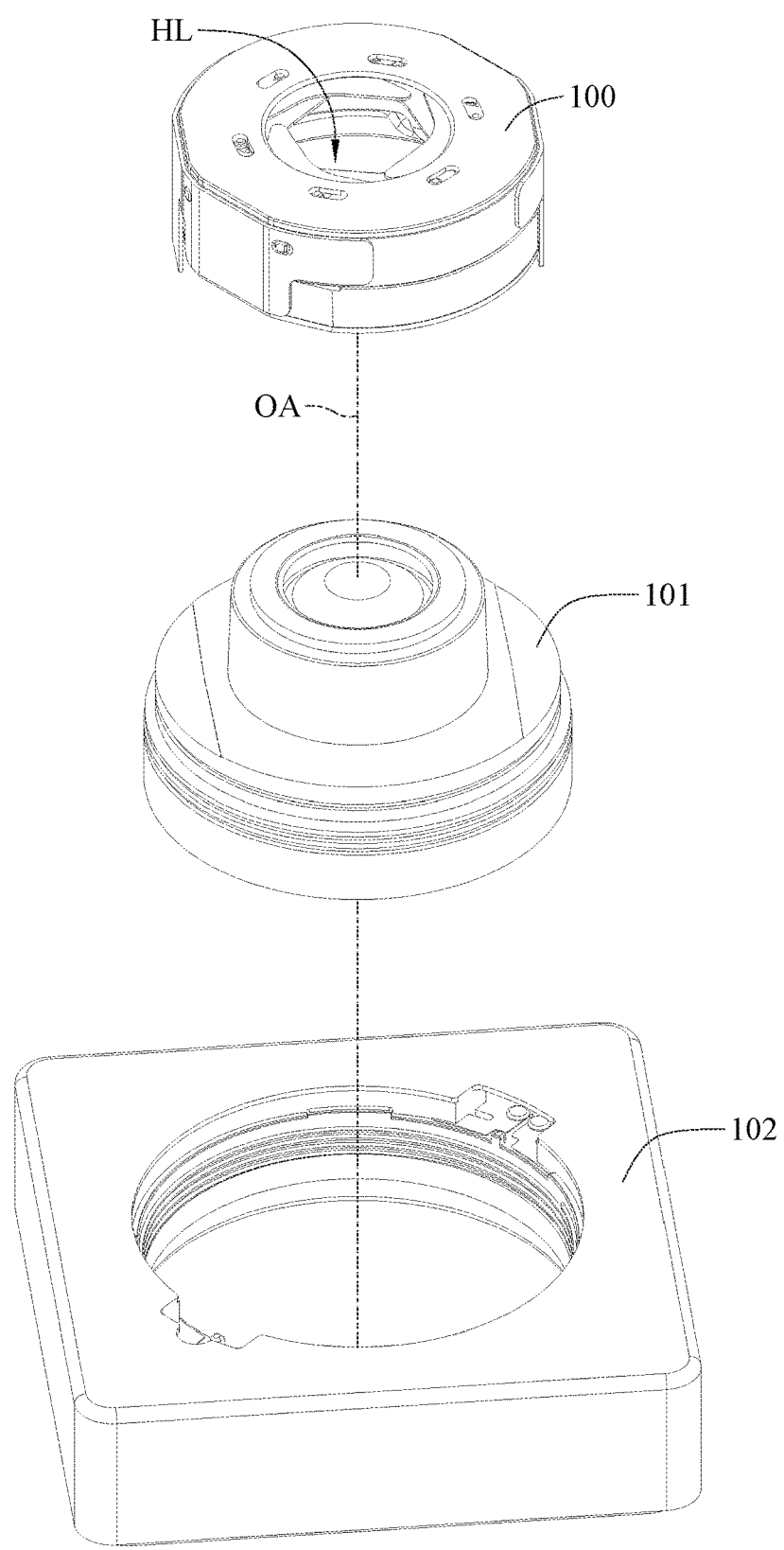
FIG. 2 is an exploded view of the imaging lens module of FIG. 1.
Figure 3:
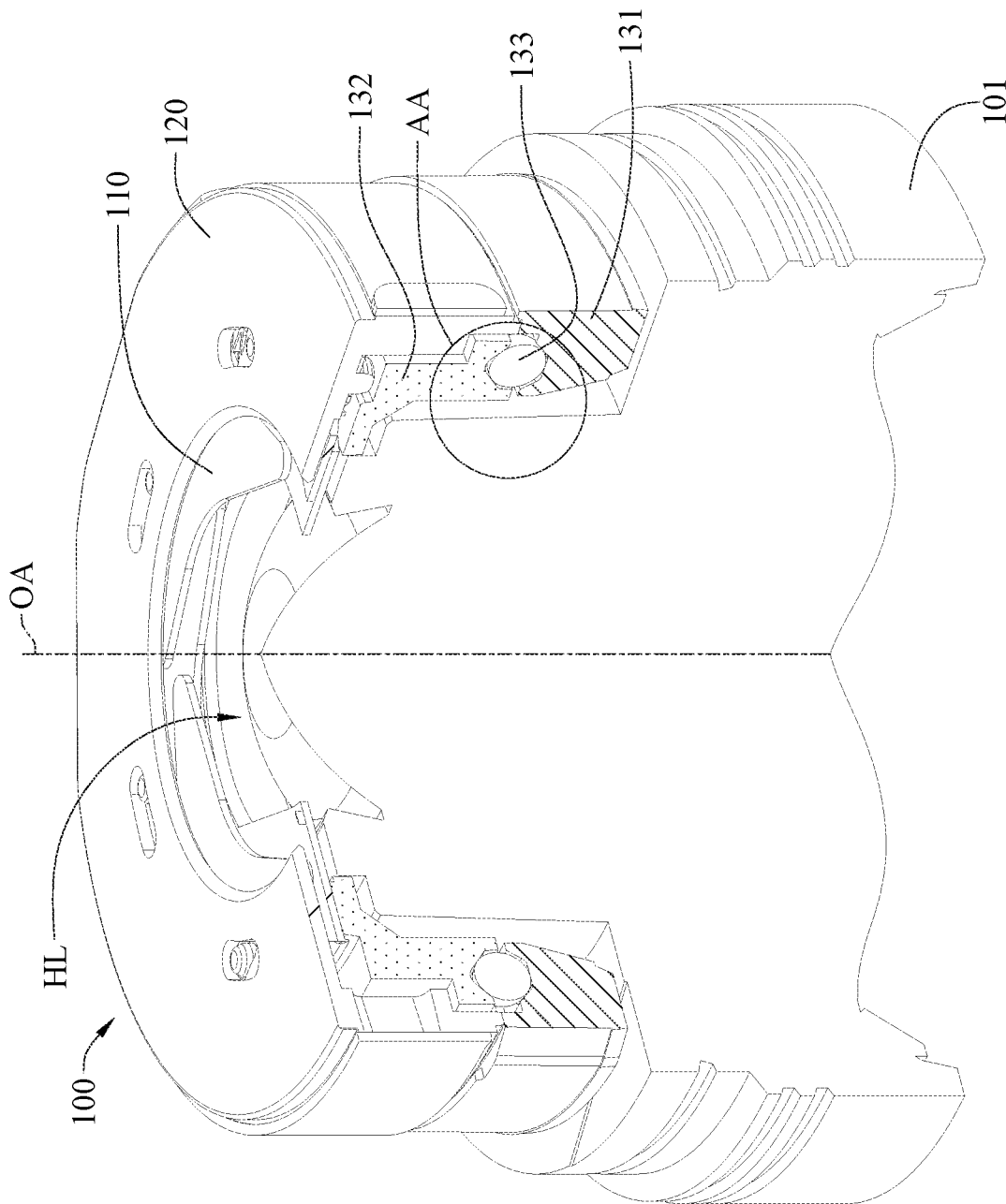
FIG. 3 is a perspective view of several components of the imaging lens module of FIG. 1 that have been sectioned.
Figure 4:
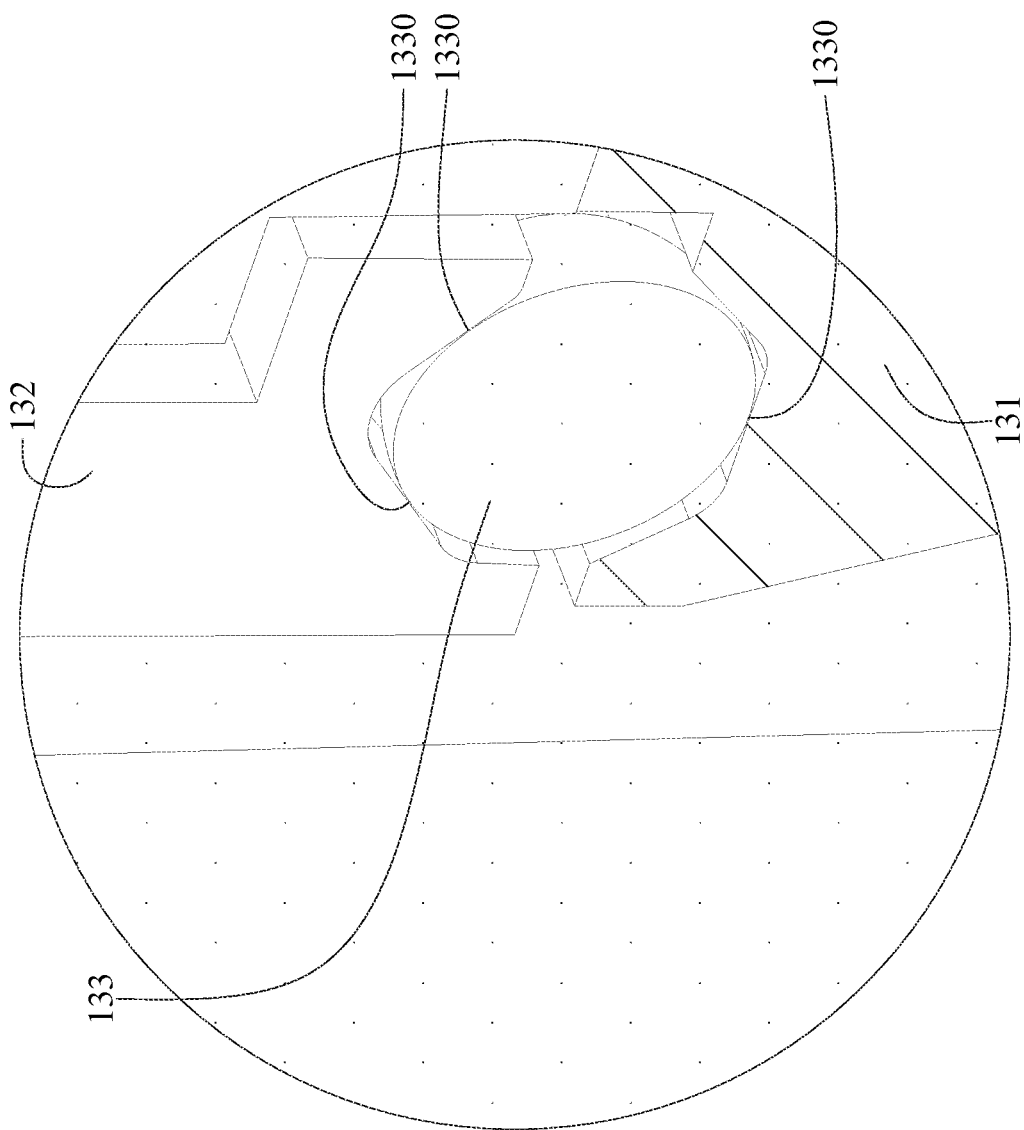
FIG. 4 is an enlarged view of AA region of FIG. 3.
Figure 5:
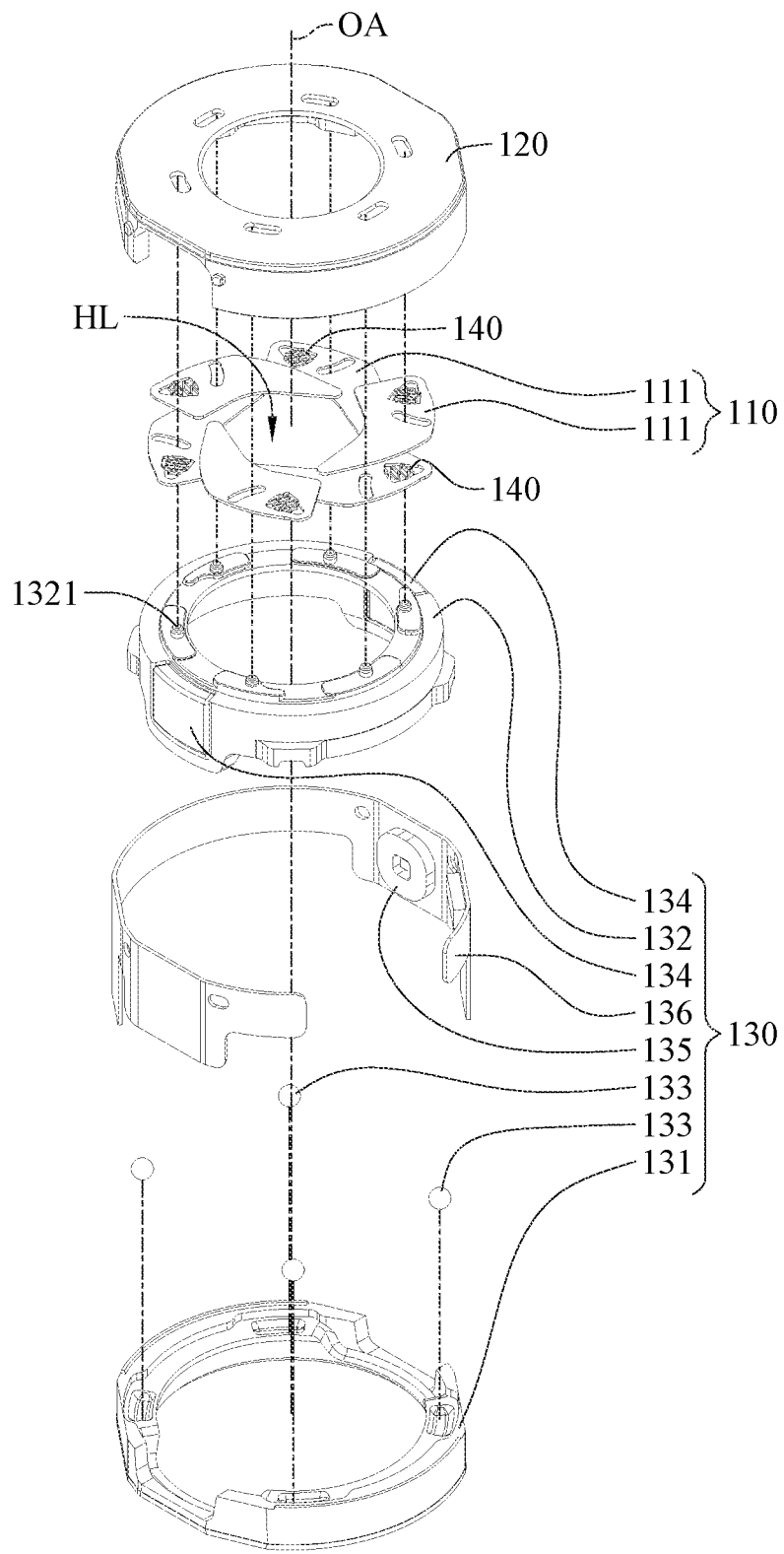
FIG. 5 is an exploded view of a variable aperture module of the imaging lens module of FIG. 2.
Figure 6:
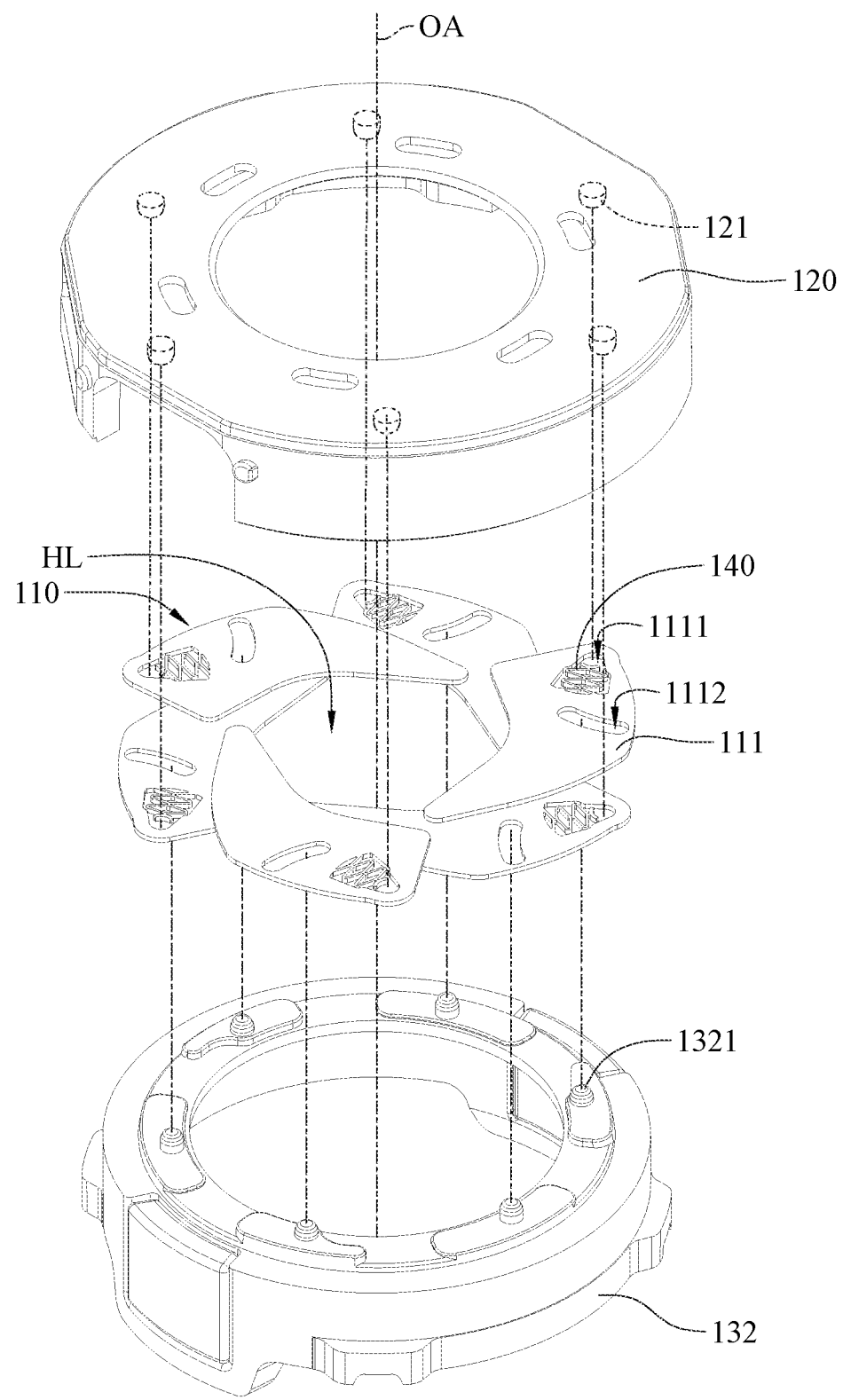
FIG. 6 is a schematic view showing the correspondence relationship of several components of the variable aperture module of FIG. 5.
Figure 7:
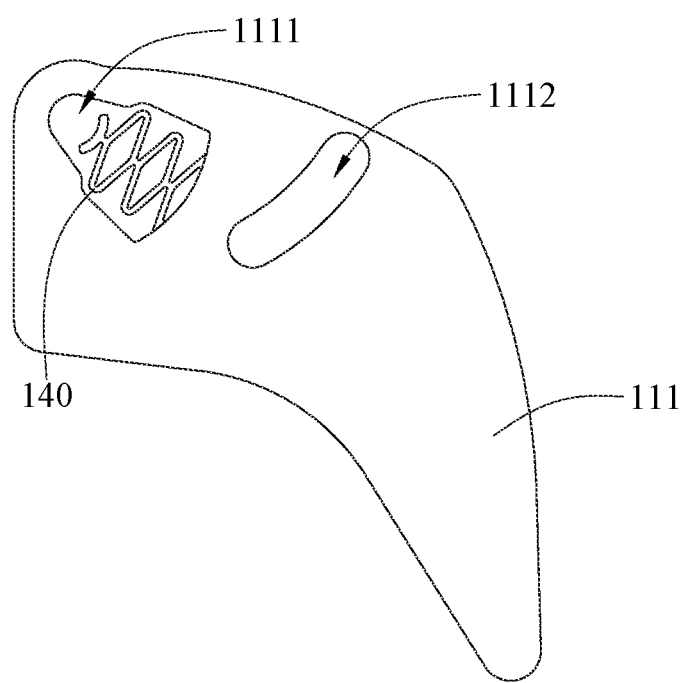
FIG. 7 is a top view of a movable blade of a blade assembly of the variable aperture module of FIG. 5.

Please refer to FIG. 1 to FIG. 7, where FIG. 1 is a perspective view of an imaging lens module according to the 1st embodiment of the present disclosure, FIG. 2 is an exploded view of the imaging lens module of FIG. 1, FIG. 3 is a perspective view of several components of the imaging lens module of FIG. 1 that have been sectioned, FIG. 4 is an enlarged view of AA region of FIG. 3, FIG. 5 is an exploded view of a variable aperture module of the imaging lens module of FIG. 2, FIG. 6 is a schematic view showing the correspondence relationship of several components of the variable aperture module of FIG. 5, and FIG. 7 is a top view of a movable blade of a blade assembly of the variable aperture module of FIG. 5.

In this embodiment, the imaging lens module 1 includes a variable aperture module 100, an imaging lens 101 and a driving module 102 that are sequentially disposed along an optical axis OA from an object side to an image side. Light enters into the imaging lens 101 via a light passable hole HL of the variable aperture module 100. The driving module 102 is able to move the imaging lens 101 so as to provide the imaging lens 101 with focus and anti-shake functions and is able to instruct the imaging lens 101 to photograph objects.

The variable aperture module 100 includes a blade assembly 110, a positioning element 120, a driving part 130 and a plurality of pressing structures 140.

The blade assembly 110 includes a plurality of movable blades 111 that are disposed around the optical axis OA to form the abovementioned light passable hole HL with an adjustable size for different hole size states. Each movable blade 111 has a positioning hole 1111 and a movement hole 1112 adjacent to the positioning hole 1111.

The positioning element 120 includes a plurality of positioning structures 121. Each positioning structure 121 is a structure of the positioning element 120 that extend downwards (extend towards the image side) along a direction parallel to the optical axis OA. The positioning structures 121 are disposed respectively corresponding to the positioning holes 1111 of the movable blades 111 so as to position the movable blades 111. Further, the positioning element 120 covers the blade assembly 110 from the object side so as to protect the blade assembly 110.

The driving part 130 includes a base 131, a rotation element 132, four bearing members 133, two magnets 134, two coils 135 and a flexible circuit board 136.

The rotation element 132 is disposed on the base 131 along a direction parallel to the optical axis OA. The rotation element 132 includes a plurality of rotation structures 1321. Each rotation structure 1321 is a structure of the rotation element 132 extend upwards (extend towards the object side) along a direction parallel to the optical axis OA. The rotation structures 1321 of the rotation element 132 are disposed respectively corresponding to the movement holes 1112 of the movable blades 111 and are movable in respective movement holes 1112. The rotation element 132 is rotatable with respect to the positioning element 120 so as to drive the movable blades 111 to rotate with respect to the positioning structures 121 of the positioning element 120 for adjusting the size of the light passable hole HL.

The spherical bearing members 133 are aligned on the same plane with respect to the optical axis OA and are disposed between the rotation element 132 and the base 131 along a direction parallel to the optical axis OA so as to support rotational motion of the rotation element 132. Each bearing member 133 has a plurality of contact points 1330 in physical contact with the rotation element 132 and the base 131. The contact points 1330 have an inner contact point, an outer contact point, an upper contact point and a lower contact point. There are various manners of physical contact of the bearing member 133 with the rotation element 132 and the base 131 through the contact points 1330, which can refer to the above descriptions for FIG. 28 to FIG. 32 and would not be repeated here.

The magnets 134 are disposed in recesses (not numbered) of the rotation element 132. The coils 135 are disposed on the flexible circuit board 136 to correspond to the magnets 134.

The flexible circuit board 136 is electrically connected to the driving module 102 so as to receive signals from the driving module 102 for adjusting the size of the light passable hole HL and therefore to change the current flowing through the coils 135 according to the received signals.

The pressing structures 140 have flexibility, and each movable blade 111 and the corresponding pressing structure 140 disposed thereon are made in one piece. In each movable blade 111, the pressing structure 140 is disposed at a side of the positioning hole 1111 close to the movement hole 1112, and the pressing structure 140 presses against the positioning structure 121 so as to reduce the backlash between the movable blade 111 and the positioning structure 121 and thus accurately control the position of the movable blade 111, thereby reducing influence caused by hysteresis of the movable blade 111 and reducing the difference between the actual value and the theoretical value of the aperture size of the imaging lens 101.

When an f-number of the imaging lens 101 is FNO, the following condition is satisfied: 0.9≤FNO≤5.6.

When a maximum field of view of the imaging lens 101 is FOV, the following condition is satisfied: 50 [deg.] ≤FOV≤105 [deg.].

2nd Embodiment

Figure 8:
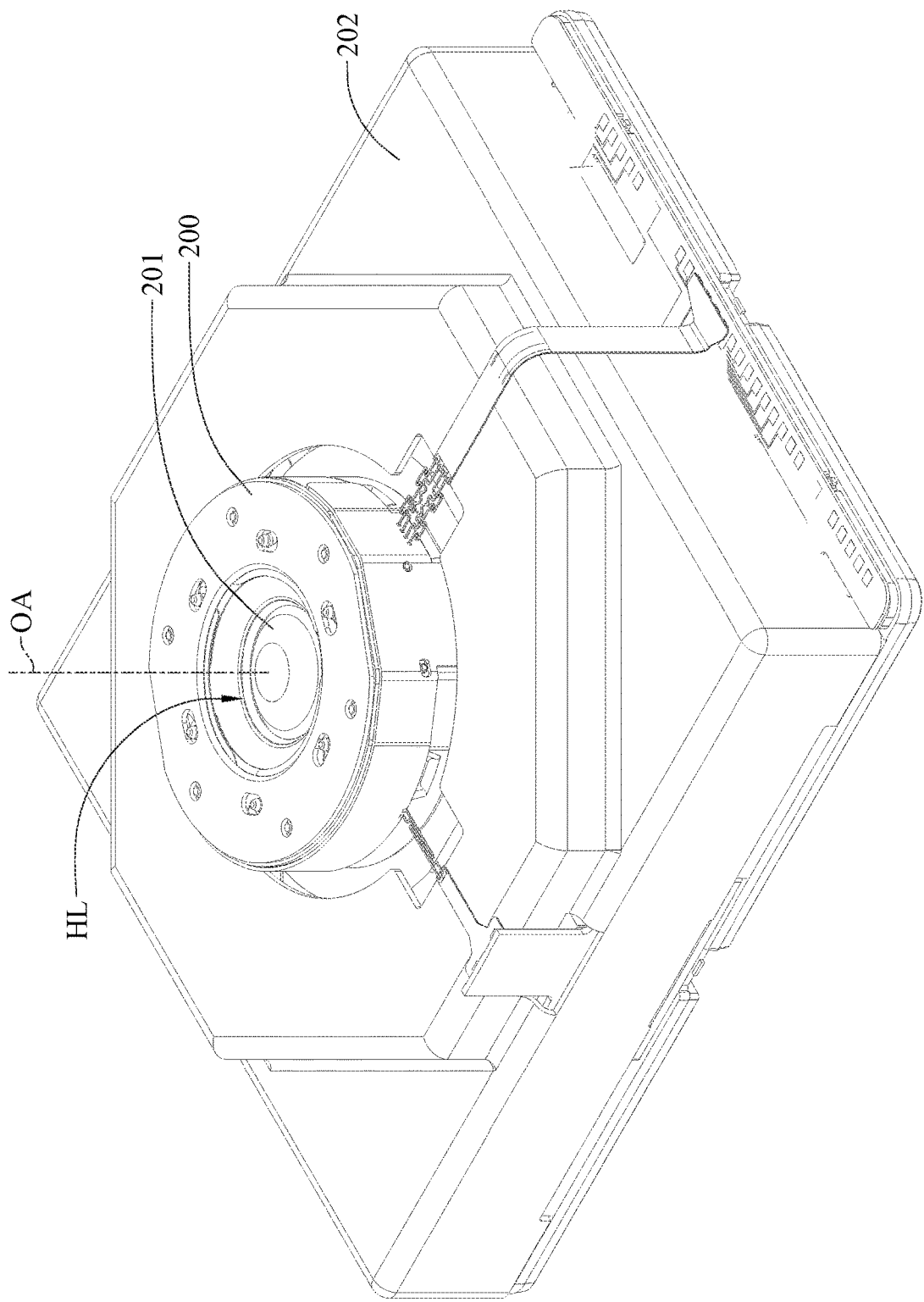
FIG. 8 is a perspective view of an imaging lens module according to the 2nd embodiment of the present disclosure.
Figure 9:
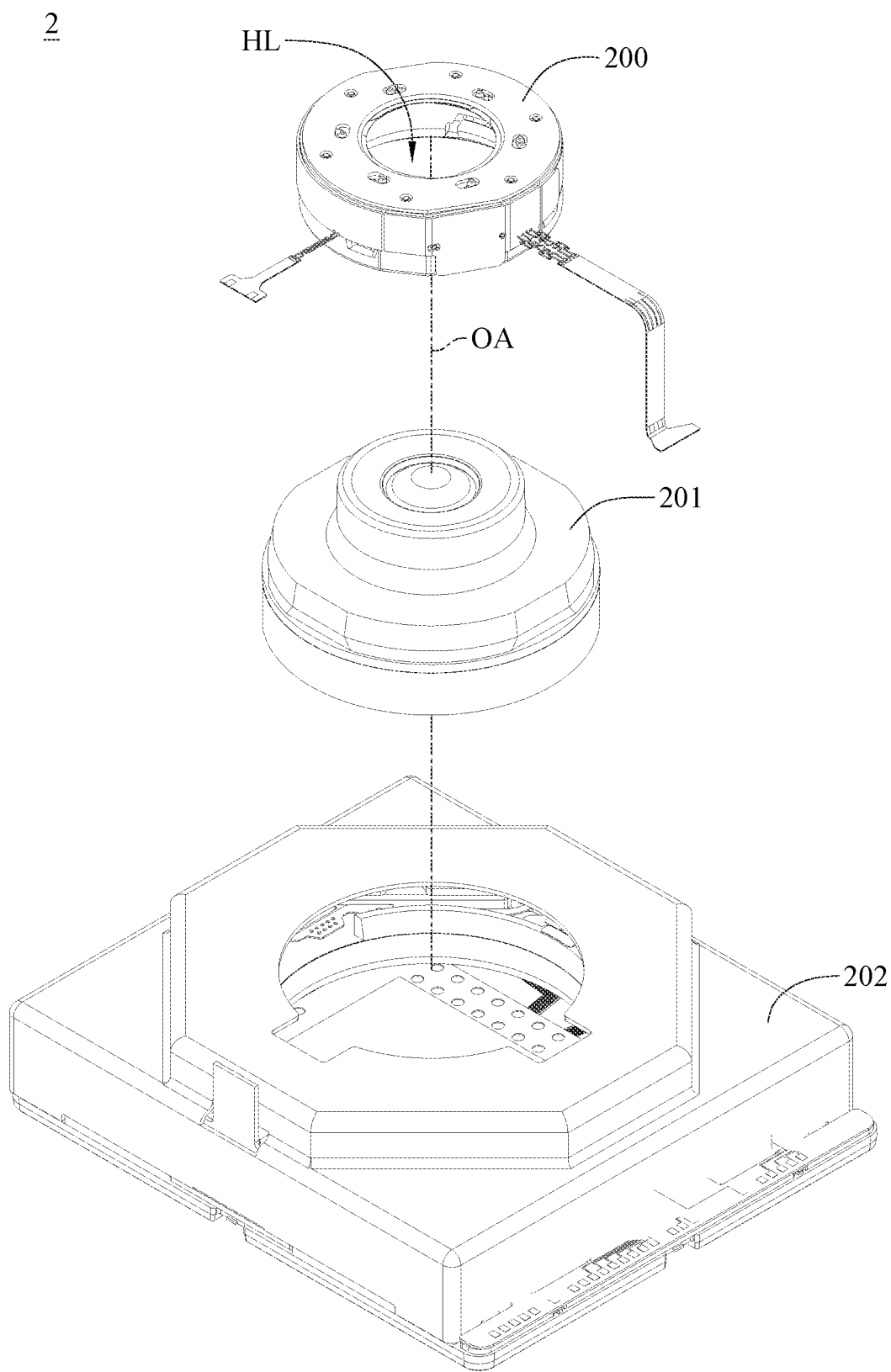
FIG. 9 is an exploded view of the imaging lens module of FIG. 8.
Figure 10:
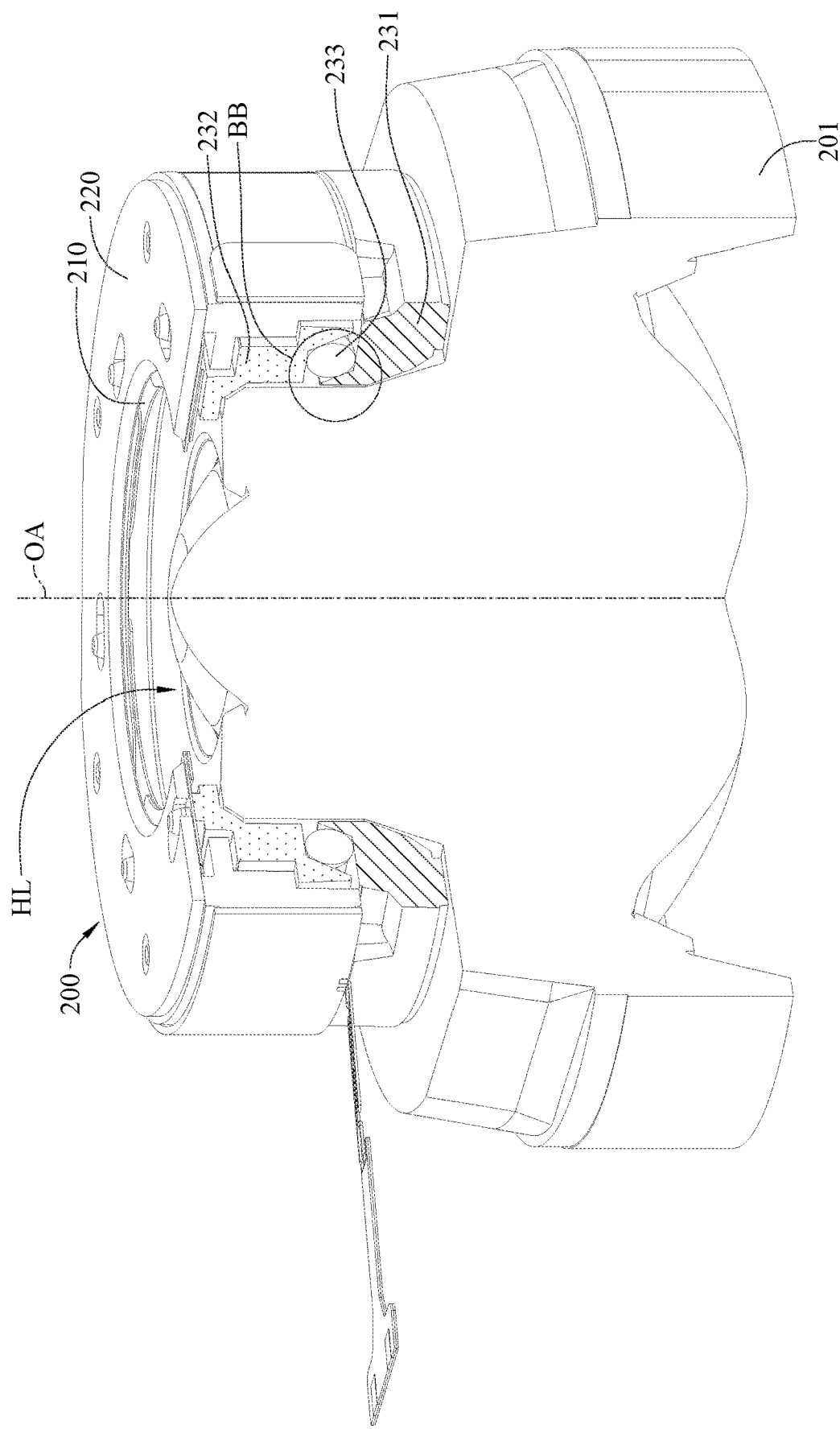
FIG. 10 is a perspective view of several components of the imaging lens module of FIG. 8 that have been sectioned.
Figure 11:
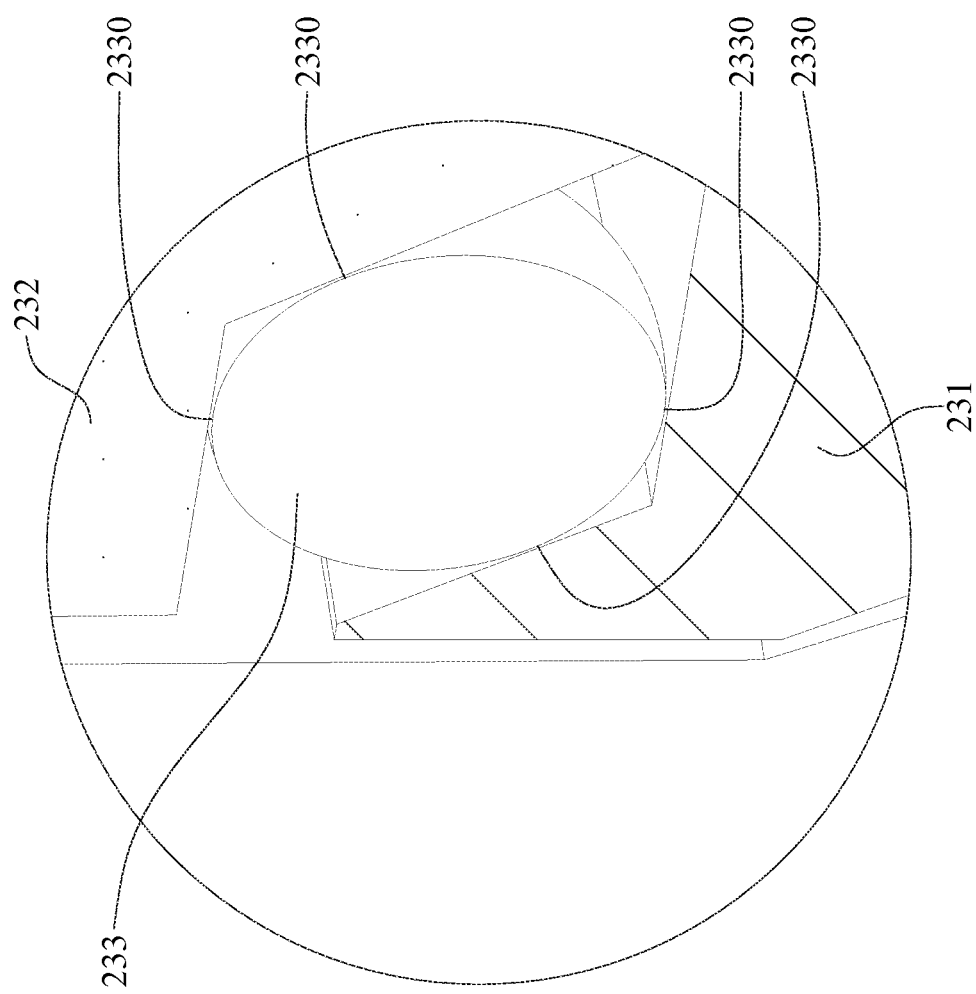
FIG. 11 is an enlarged view of BB region of FIG. 10.
Figure 12:
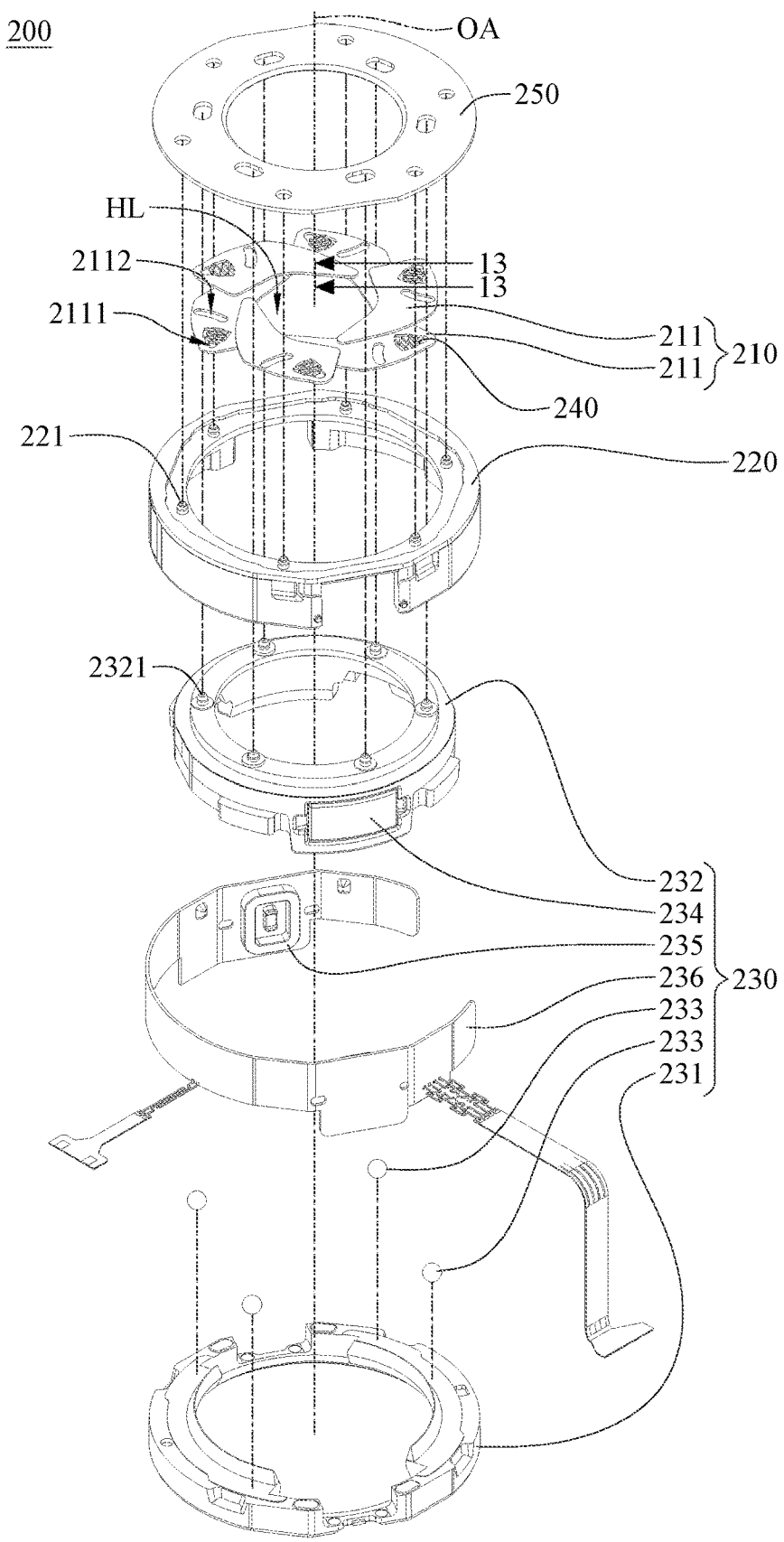
FIG. 12 is an exploded view of a variable aperture module of the imaging lens module of FIG. 9.
Figure 13:
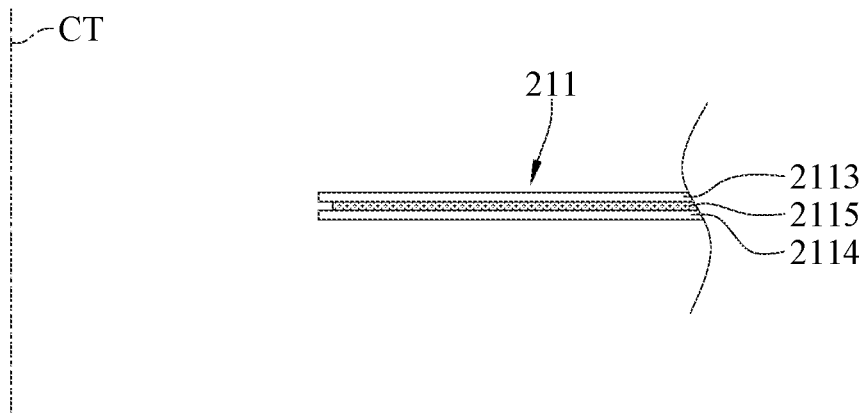
FIG. 13 is a cross-sectional view of part of a blade assembly of the variable aperture module sectioned along line 13-13 of FIG. 12.
Figure 14:
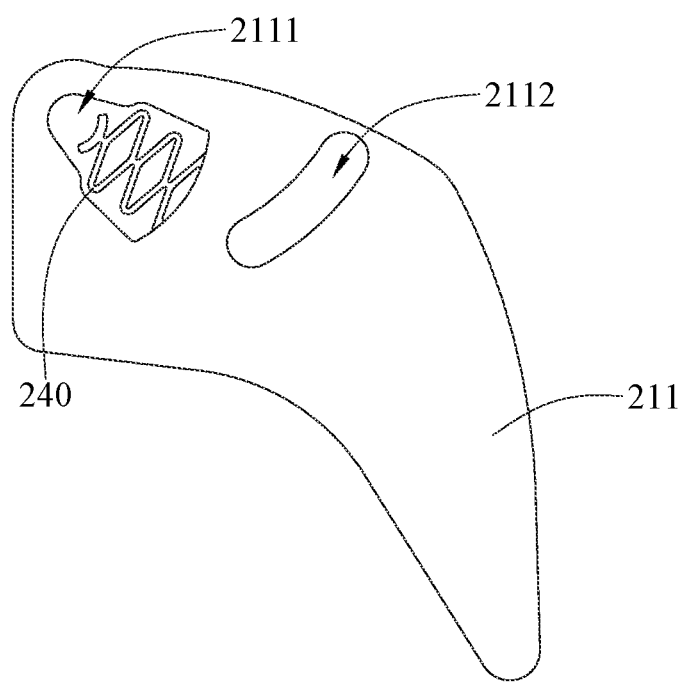
FIG. 14 is a top view of a movable blade of the blade assembly of the variable aperture module of FIG. 12.

Please refer to FIG. 8 to FIG. 14, where FIG. 8 is a perspective view of an imaging lens module according to the 2nd embodiment of the present disclosure, FIG. 9 is an exploded view of the imaging lens module of FIG. 8, FIG. 10 is a perspective view of several components of the imaging lens module of FIG. 8 that have been sectioned, FIG. 11 is an enlarged view of BB region of FIG. 10, FIG. 12 is an exploded view of a variable aperture module of the imaging lens module of FIG. 9, FIG. 13 is a cross-sectional view of part of a blade assembly of the variable aperture module sectioned along line 13-13 of FIG. 12, and FIG. 14 is a top view of a movable blade of the blade assembly of the variable aperture module of FIG. 12.

In this embodiment, the imaging lens module 2 includes a variable aperture module 200, an imaging lens 201 and a driving module 202 that are sequentially disposed along an optical axis OA from an object side to an image side. Light enters into the imaging lens 201 via a light passable hole HL of the variable aperture module 200. The driving module 202 is able to move the imaging lens 201 so as to provide the imaging lens 201 with focus and anti-shake functions and is able to instruct the imaging lens 201 to photograph objects.

The variable aperture module 200 includes a blade assembly 210, a positioning element 220, a driving part 230, a plurality of pressing structures 240 and a cover 250.

The blade assembly 210 includes a plurality of movable blades 211 that are disposed around the optical axis OA to form the abovementioned light passable hole HL with an adjustable size for different hole size states. Each movable blade 211 has a positioning hole 2111 and a movement hole 2112 adjacent to the positioning hole 2111.

Each movable blade 211 is a multi-layer structure composed of composite materials. Specifically, each movable blade 211 includes a first surface layer 2113, a second surface layer 2114 and an inner substrate layer 2115. The inner substrate layer 2115 is located between the first surface layer 2113 and the second surface layer 2114, and the first surface layer 2113 and the second surface layer 2114 are located closer to the center CT of the light passable hole HL than the inner substrate layer 2115, as shown in FIG. 12 and FIG. 13.

The positioning element 220 includes a plurality of positioning structures 221. Each positioning structure 221 is a structure of the positioning element 220 that extend upwards (extend towards the object side) along a direction parallel to the optical axis OA. The positioning structures 221 are disposed respectively corresponding to the positioning holes 2111 of the movable blades 211 so as to position the movable blades 211. Further, the positioning element 220 and the cover 250 are respectively disposed from two opposite sides of the blade assembly 210 along directions parallel to the optical axis OA so as to protect the blade assembly 210.

The driving part 230 includes a base 231, a rotation element 232, four bearing members 233, two magnets 234, two coils 235 and a flexible circuit board 236.

The rotation element 232 is disposed on the base 231 along a direction parallel to the optical axis OA. The rotation element 232 includes a plurality of rotation structures 2321. Each rotation structure 2321 is a structure of the rotation element 232 extend upwards (extend towards the object side) along a direction parallel to the optical axis OA. The rotation structures 2321 of the rotation element 232 are disposed respectively corresponding to the movement holes 2112 of the movable blades 211 and are movable in respective movement holes 2112. The rotation element 232 is rotatable with respect to the positioning element 220 so as to drive the movable blades 211 to rotate with respect to the positioning structures 221 of the positioning element 220 for adjusting the size of the light passable hole HL.

The spherical bearing members 233 are aligned on the same plane with respect to the optical axis OA and are disposed between the rotation element 232 and the base 231 along a direction parallel to the optical axis OA so as to support rotational motion of the rotation element 232. Each bearing member 233 has a plurality of contact points 2330 in physical contact with the rotation element 232 and the base 231. The contact points 2330 have an inner contact point, an outer contact point, an upper contact point and a lower contact point. There are various manners of physical contact of the bearing member 233 with the rotation element 232 and the base 231 through the contact points 2330, which can refer to the above descriptions for FIG. 28 to FIG. 32 and would not be repeated here.

The magnets 234 are disposed in recesses (not numbered) of the rotation element 232. The coils 235 are disposed on the flexible circuit board 236 to correspond to the magnets 234.

The flexible circuit board 236 is electrically connected to the driving module 202 so as to receive signals from the driving module 202 for adjusting the size of the light passable hole HL and therefore to change the current flowing through the coils 235 according to the received signals.

The pressing structures 240 have flexibility, and each movable blade 211 and the corresponding pressing structure 240 disposed thereon are made in one piece. In each movable blade 211, the pressing structure 240 is disposed at a side of the positioning hole 2111 close to the movement hole 2112, and the pressing structure 240 presses against the positioning structure 221 so as to reduce the backlash between the movable blade 211 and the positioning structure 221 and thus accurately control the position of the movable blade 211, thereby reducing influence caused by hysteresis of the movable blade 211 and reducing the difference between the actual value and the theoretical value of the aperture size of the imaging lens 201.

When an f-number of the imaging lens 201 is FNO, the following condition is satisfied: 0.9≤FNO≤5.6.

When a maximum field of view of the imaging lens 201 is FOV, the following condition is satisfied: 50 [deg.] ≤FOV≤105 [deg.].

In each movable blade 211 of this embodiment, the arrangement of the pressing structure 240 disposed at a side of the positioning hole 2111 close to the movement hole 2112 is not intended to restrict the present disclosure. Different arrangements of pressing structures disposed on movable blades in some other embodiments of the present disclosure will be illustrated hereinafter.

3rd Embodiment

Figure 15:
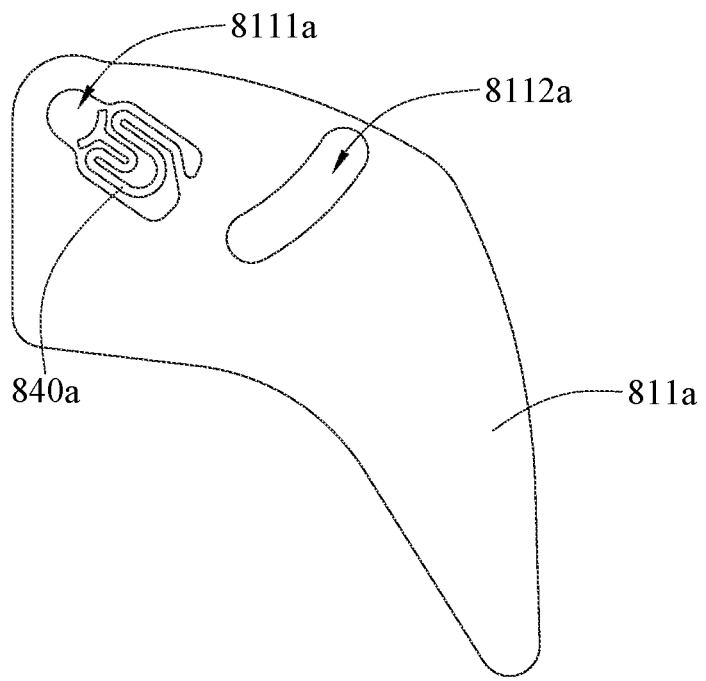
FIG. 15 is a top view of a movable blade of an imaging lens module according to the 3rd embodiment of the present disclosure.

Please refer to FIG. 15, which is a top view of a movable blade of an imaging lens module according to the 3rd embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

Compared to the pressing structure 140 shaped like a pantograph in the 1st embodiment, the pressing structure 840a in this embodiment is shaped like a paper clip and is disposed at a side of the positioning hole 8111a of the movable blade 811a close to the movement hole 8112a for pressing against the positioning structure (not shown in this embodiment).

4th Embodiment

Figure 16:
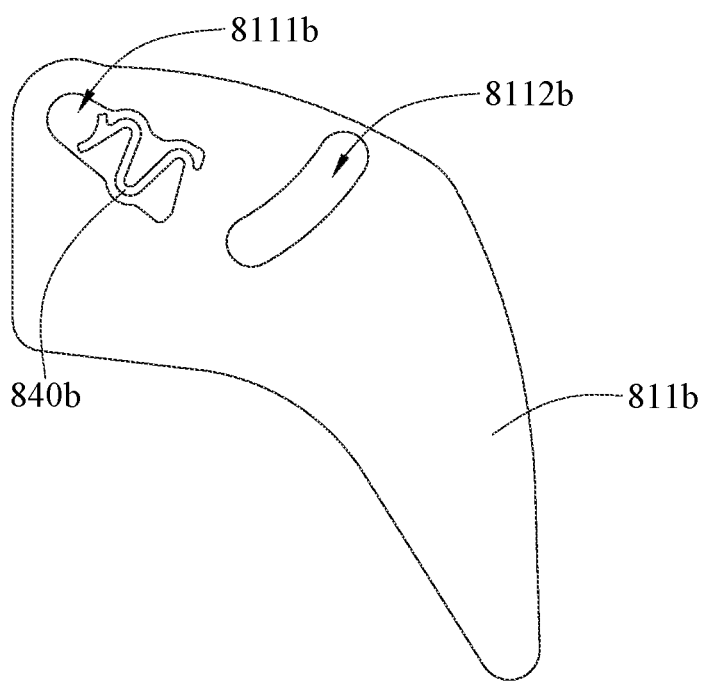
FIG. 16 is a top view of a movable blade of an imaging lens module according to the 4th embodiment of the present disclosure.

Please refer to FIG. 16, which is a top view of a movable blade of an imaging lens module according to the 4th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

Compared to the pressing structure 140 shaped like a pantograph in the 1st embodiment, the pressing structure 840b in this embodiment is serpentine and is disposed at a side of the positioning hole 8111b of the movable blade 811b close to the movement hole 8112b for pressing against the positioning structure (not shown in this embodiment).

5th Embodiment

Figure 17:
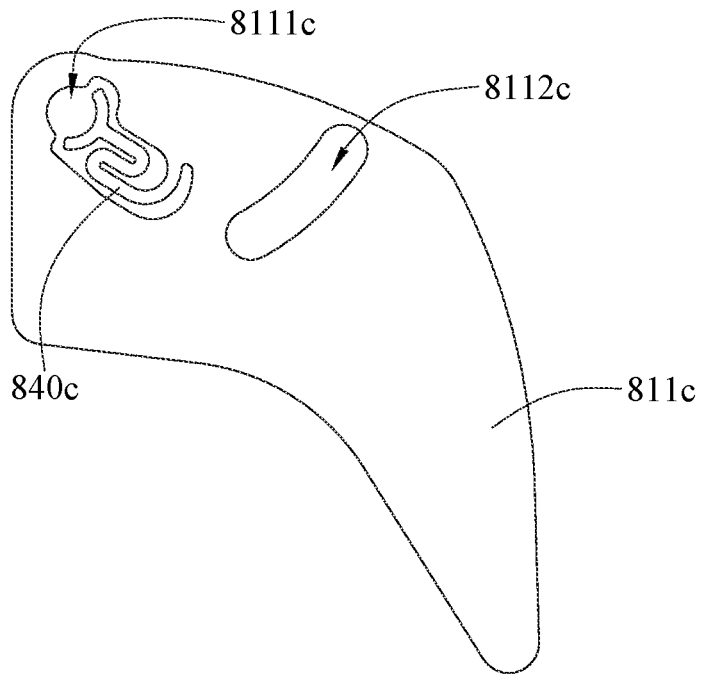
FIG. 17 is a top view of a movable blade of an imaging lens module according to the 5th embodiment of the present disclosure.

Please refer to FIG. 17, which is a top view of a movable blade of an imaging lens module according to the 5th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

Compared to the pressing structure 140 shaped like a pantograph in the 1st embodiment, the pressing structure 840c in this embodiment is shaped like a "Z" letter and is disposed at a side of the positioning hole 8111c of the movable blade 811c close to the movement hole 8112c for pressing against the positioning structure (not shown in this embodiment).

6th Embodiment

Figure 18:
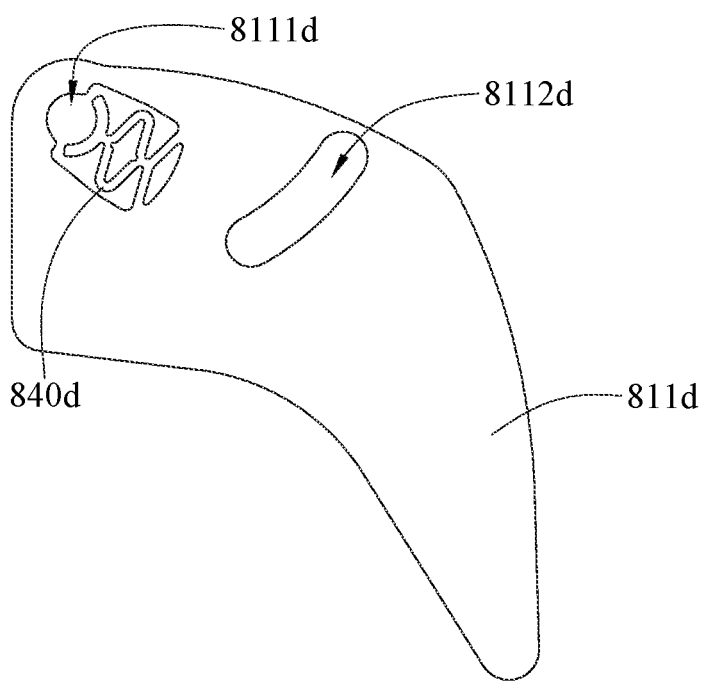
FIG. 18 is a top view of a movable blade of an imaging lens module according to the 6th embodiment of the present disclosure.

Please refer to FIG. 18, which is a top view of a movable blade of an imaging lens module according to the 6th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

Compared to the pressing structure 140 shaped like a pantograph with three intersections in the 1st embodiment, it is different that the pressing structure 840d in this embodiment is shaped like a pantograph with only two intersections. Similarly, the pressing structure 840d is disposed at a side of the positioning hole 8111d of the movable blade 811d close to the movement hole 8112d for pressing against the positioning structure (not shown in this embodiment).

7th Embodiment

Figure 19:
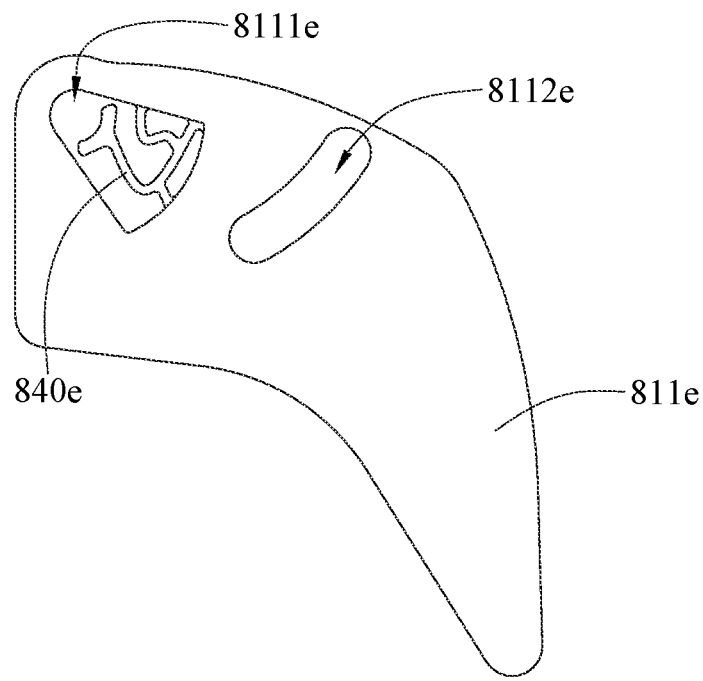
FIG. 19 is a top view of a movable blade of an imaging lens module according to the 7th embodiment of the present disclosure.

Please refer to FIG. 19, which is a top view of a movable blade of an imaging lens module according to the 7th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

Compared to the pressing structure 140 disposed at only one side of the positioning hole 1111 of the movable blade 111 close to the movement hole 1112 in the 1st embodiment, the pressing structure 840e in this embodiment is disposed at a side of the positioning hole 8111e of the movable blade 811e close to the movement hole 8112e and an adjacent side thereof for pressing against the positioning structure (not shown in this embodiment).

8th Embodiment

Figure 20:
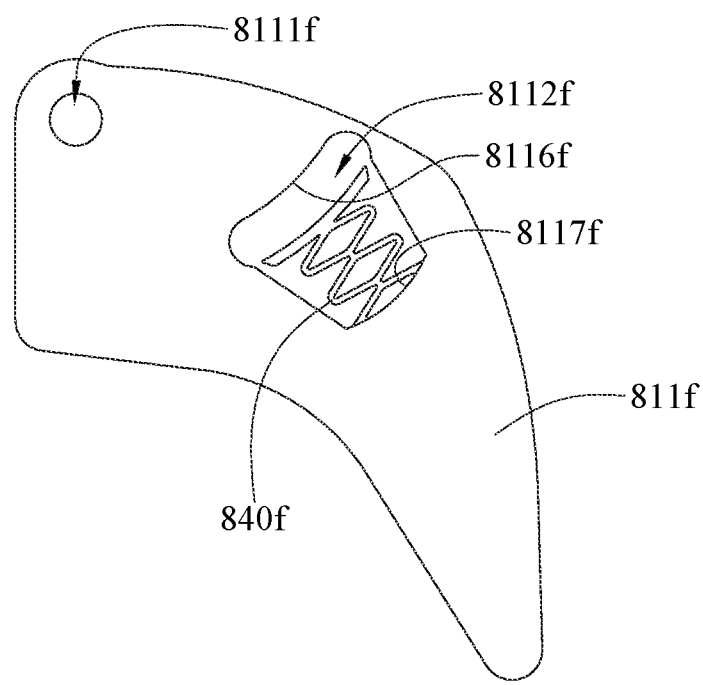
FIG. 20 is a top view of a movable blade of an imaging lens module according to the 8th embodiment of the present disclosure.

Please refer to FIG. 20, which is a top view of a movable blade of an imaging lens module according to the 8th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

In this embodiment, each movable blade 811f further has an inner surface 8116f and an outer surface 8117f at the movement hole 8112f thereof, and the inner surface 8116f is located closer to the positioning hole 8111f than the outer surface 8117f.

Compared to the pressing structure 140 disposed in the positioning hole 1111 of the movable blade 111 in the 1st embodiment, the pressing structure 840f in this embodiment is disposed on the outer surface 8117f of the movable blade 811f at the movement hole 8112f for pressing against the rotation element (not shown in this embodiment).

9th Embodiment

Figure 21:
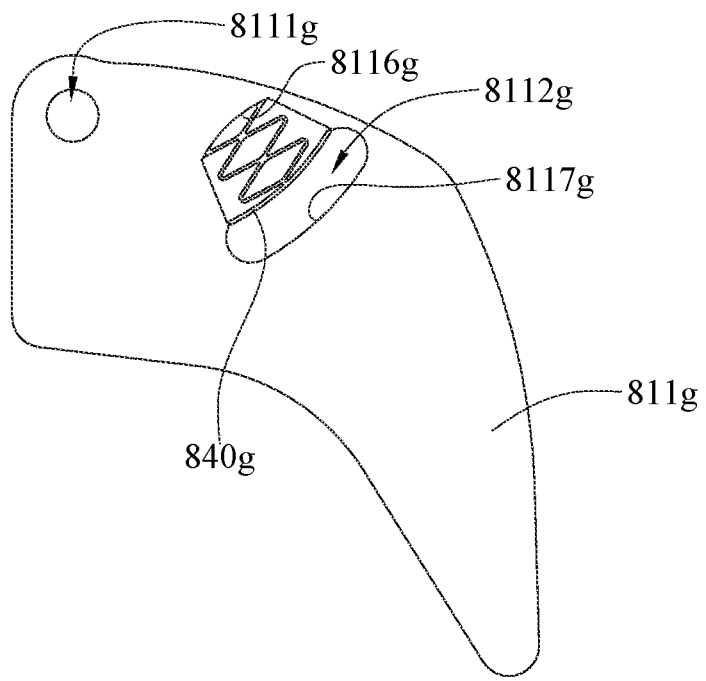
FIG. 21 is a top view of a movable blade of an imaging lens module according to the 9th embodiment of the present disclosure.

Please refer to FIG. 21, which is a top view of a movable blade of an imaging lens module according to the 9th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

In this embodiment, each movable blade 811g further has an inner surface 8116g and an outer surface 8117g at the movement hole 8112g thereof, and the inner surface 8116g is located closer to the positioning hole 8111g than the outer surface 8117g.

Compared to the pressing structure 140 disposed in the positioning hole 1111 of the movable blade 111 in the 1st embodiment, the pressing structure 840g in this embodiment is disposed on the inner surface 8116g of the movable blade

811g at the movement hole 8112g for pressing against the rotation element (not shown in this embodiment).

10th Embodiment

Figure 22:
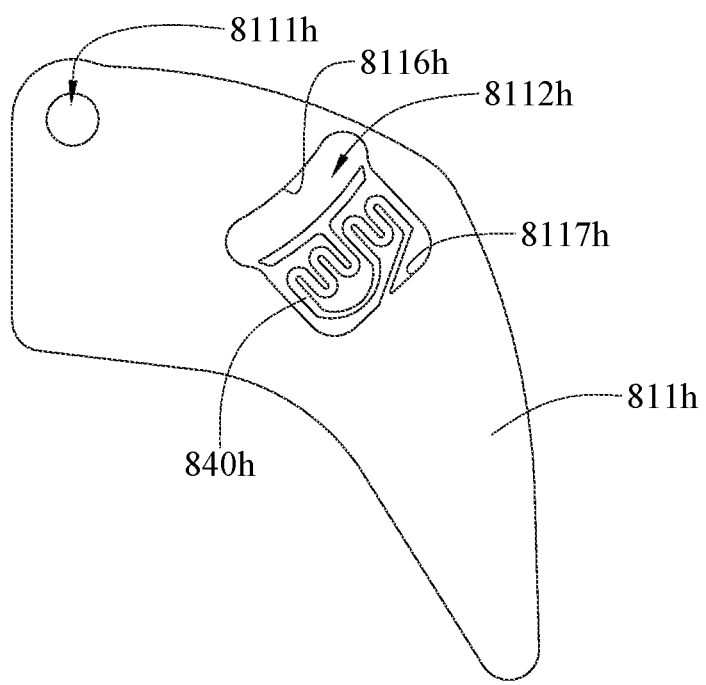
FIG. 22 is a top view of a movable blade of an imaging lens module according to the 10th embodiment of the present disclosure.

Please refer to FIG. 22, which is a top view of a movable blade of an imaging lens module according to the 10th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

In this embodiment, each movable blade 811h further has an inner surface 8116h and an outer surface 8117h at the movement hole 8112h thereof, and the inner surface 8116h is located closer to the positioning hole 8111h than the outer surface 8117h.

Compared to the pressing structure 140 shaped like a pantograph and is disposed in the positioning hole 1111 of the movable blade 111 in the 1st embodiment, the pressing structure 840h in this embodiment is provided with a plurality of curved portions and is disposed on the outer surface 8117h of the movable blade 811h at the movement hole 8112h for pressing against the rotation element (not shown in this embodiment).

11th Embodiment

Figure 23:
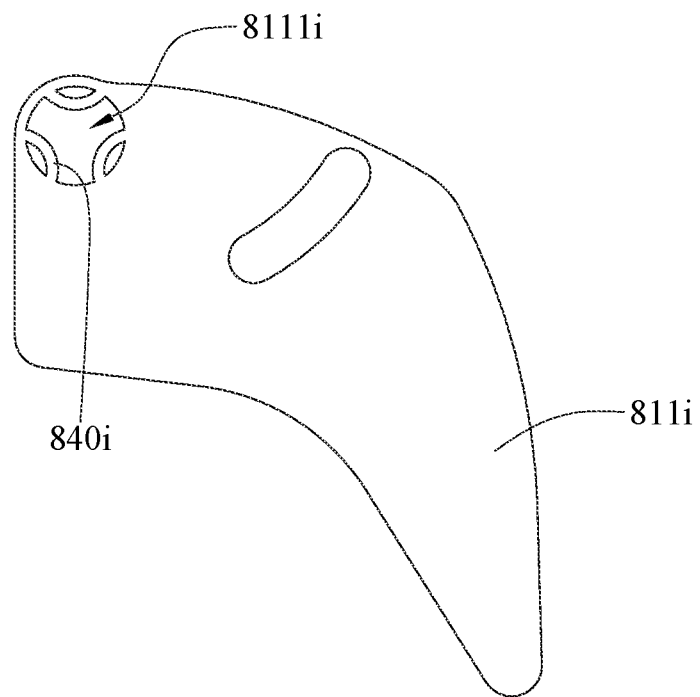
FIG. 23 is a top view of a movable blade of an imaging lens module according to the 11th embodiment of the present disclosure.

Please refer to FIG. 23, which is a top view of a movable blade of an imaging lens module according to the 11th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

Compared to the pressing structure 140 shaped like a pantograph and is disposed at a side of the positioning hole 1111 of the movable blade 111 close to the movement hole 1112 in the 1st embodiment, the pressing structure 840i in this embodiment is shaped like three arches and is disposed evenly around the inner wall (not numbered) of the positioning hole 8111i of the movable blade 811i for pressing against the positioning structure (not shown in this embodiment).

12th Embodiment

Figure 24:
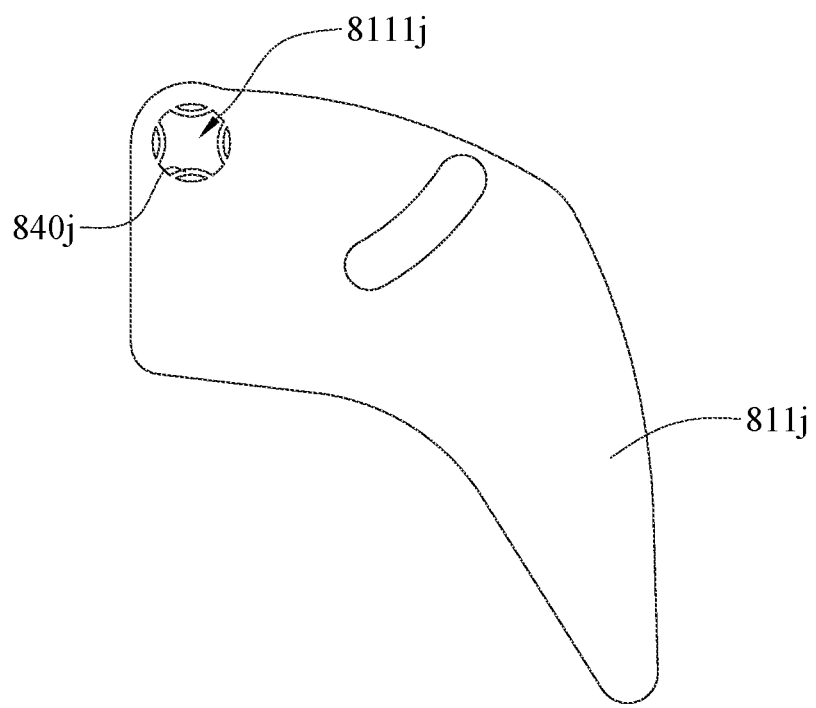
FIG. 24 is a top view of a movable blade of an imaging lens module according to the 12th embodiment of the present disclosure.

Please refer to FIG. 24, which is a top view of a movable blade of an imaging lens module according to the 12th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

Compared to the pressing structure 140 shaped like a pantograph and is disposed at a side of the positioning hole 1111 of the movable blade 111 close to the movement hole 1112 in the 1st embodiment, the pressing structure 840j in this embodiment is shaped like four arches and is disposed evenly around the inner wall (not numbered) of the positioning hole 8111j of the movable blade 811j for pressing against the positioning structure (not shown in this embodiment).

13th Embodiment

Figure 25:
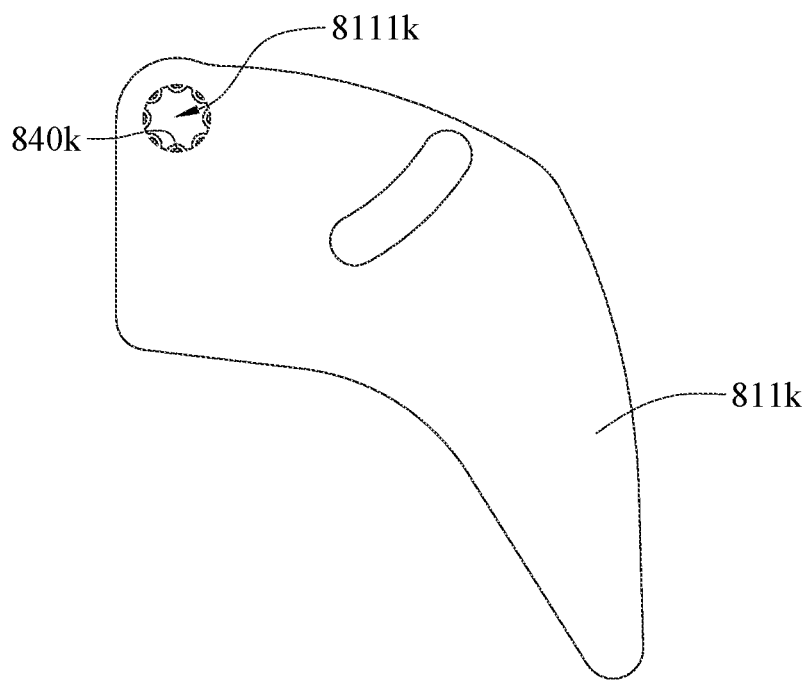
FIG. 25 is a top view of a movable blade of an imaging lens module according to the 13th embodiment of the present disclosure.

Please refer to FIG. 25, which is a top view of a movable blade of an imaging lens module according to the 13th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

Compared to the pressing structure 140 shaped like a pantograph and is disposed at a side of the positioning hole 1111 of the movable blade 111 close to the movement hole 1112 in the 1st embodiment, the pressing structure 840k in this embodiment is shaped like eight arches and is disposed evenly around the inner wall (not numbered) of the positioning hole 8111k of the movable blade 811k for pressing against the positioning structure (not shown in this embodiment).

14th Embodiment

Figure 26:
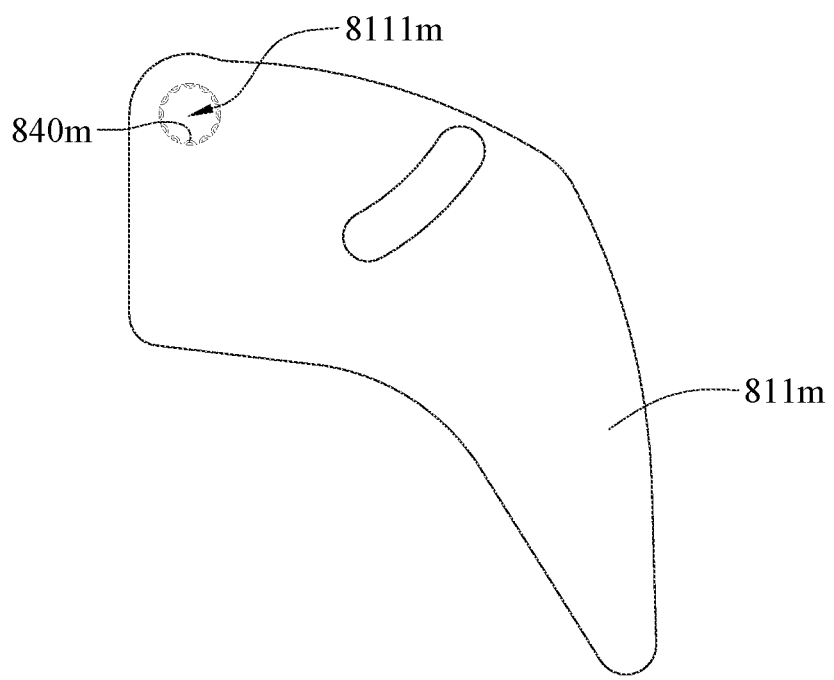
FIG. 26 is a top view of a movable blade of an imaging lens module according to the 14th embodiment of the present disclosure.

Please refer to FIG. 26, which is a top view of a movable blade of an imaging lens module according to the 14th embodiment of the present disclosure.

An imaging lens module (not numbered) provided in this embodiment is substantially similar to the imaging lens module 1 of the 1st embodiment in structure. Therefore, only difference between this and the 1st embodiment together with description relating to essential structure will be illustrated hereinafter.

Compared to the pressing structure 140 shaped like a pantograph and is disposed at a side of the positioning hole 1111 of the movable blade 111 close to the movement hole 1112 in the 1st embodiment, the pressing structure 840m in this embodiment is shaped like eight arches and is disposed evenly around the inner wall (not numbered) of the positioning hole 8111m of the movable blade 811m for pressing against the positioning structure (not shown in this embodiment).

15th Embodiment

Figure 27:
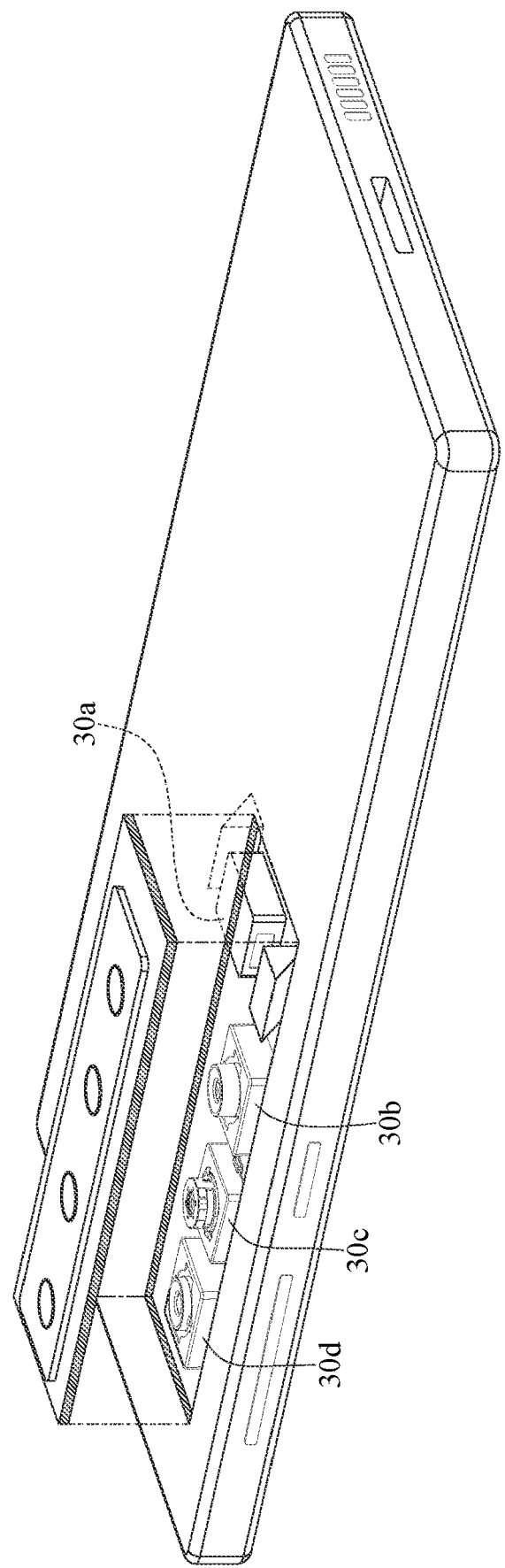
FIG. 27 is an exploded view of an electronic device according to the 15th embodiment of the present disclosure.

Please refer to FIG. 27, which is an exploded view of an electronic device according to the 15th embodiment of the present disclosure.

An electronic device 3 provided in this embodiment is a smartphone including an imaging lens module 30a, an imaging lens module 30b, an imaging lens module 30c, an imaging lens module 30d, a flash module, a focus assist module, an image signal processor, a display module and an image software processor (not shown). The imaging lens module 30a, the imaging lens module 30b, the imaging lens module 30c, and the imaging lens module 30d are disposed on the same side of the electronic device 3, while the display module is disposed on the opposite side of the electronic device 3. Moreover, the imaging lens module 30c is the imaging lens module 1 disclosed in the 1st embodiment. However, the present disclosure is not limited thereto. The imaging lens module 30c may be the imaging lens module disclosed in any one of the abovementioned embodiments.

The imaging lens module 30a is an ultra-telephoto lens, the imaging lens module 30b is a telephoto lens, the imaging lens module 30c is a wide-angle main lens, and the imaging lens module 30d is an ultra-wide-angle lens. The imaging lens module 30a may have a field of view ranging from 5 degrees to 30 degrees, the imaging lens module 30b may have a field of view ranging from 30 degrees to 60 degrees, the imaging lens module 30c may have a field of view ranging from 65 degrees to 30 degrees, and the imaging lens module 30d may have a field of view ranging from 33 degrees to 175 degrees. In this embodiment, the imaging lens modules 30a, 30b, 30c and 30d have different fields of view, such that the electronic device 3 can have various magnification ratios so as to meet the requirement of optical zoom functionality. Moreover, the imaging lens module 30a is an ultra-telephoto lens having a reflective element, which is favorable for thinness of the electronic device 3. In this embodiment, the electronic device 3 includes multiple imaging lens modules 30a, 30b, 30c and 30d, but the present disclosure is not limited to the number and arrangement of imaging lens modules.

When a user captures images of an object, the light rays converge in the imaging lens module 30a, the imaging lens module 30b, the imaging lens module 30c or the imaging lens module 30d to generate images, and the flash module is activated for light supplement. The focus assist module detects the object distance of the imaged object to achieve fast auto focusing. The image signal processor is configured to optimize the captured image to improve image quality and provided zooming function. The light beam emitted from the focus assist module can be either conventional infrared or laser. The display module can include a touch screen or a physical button. The image software processor having multiple functions to capture images and complete image processing, and the image processed by the image software processor can be displayed on the display module.

Please be noted that a lens cover of the electronic device 3 shown in FIG. 27 being spaced apart from the main body thereof is only for better showing the imaging lens modules inside the electronic device 3. It doesn't mean the lens cover have to be removable, and the present disclosure is not limited thereto.

The smartphone in these embodiments is only exemplary for showing the variable aperture module and the imaging lens modules of the present disclosure installed in the electronic device 3, and the present disclosure is not limited thereto. The variable aperture module and the imaging lens modules of the present disclosure can be optionally applied to optical systems with a movable focus. Furthermore, the variable aperture module and the imaging lens modules of the present disclosure feature good capability in aberration corrections and high image quality, and can be applied to 3D image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A variable aperture module, comprising:
a blade assembly, comprising:
a plurality of movable blades, disposed around an optical axis to form a light passable hole with an adjustable size for different hole size states, wherein each of the plurality of movable blades has:
a positioning hole; and
a movement hole, adjacent to the positioning hole;
a positioning element, comprising:
a plurality of positioning structures, disposed respectively corresponding to the positioning holes of the plurality of movable blades so as to position the plurality of movable blades;
a driving part, comprising:
a rotation element, disposed corresponding to the movement holes of the plurality of movable blades and rotatable with respect to the positioning element so as to drive the plurality of movable blades to rotate with respect to the plurality of positioning structures of the positioning element for adjusting a size of the light passable hole; and
a plurality of pressing structures, disposed respectively corresponding to the plurality of movable blades, wherein each of the plurality of pressing structures is at least disposed into at least one of the positioning hole and the movement hole of corresponding one among the plurality of movable blades, and each of the plurality of pressing structures at least presses against at least one of corresponding one among the plurality of positioning structures and the rotation element;
wherein each of the plurality of movable blades comprises:
a first surface layer;
a second surface layer; and
an inner substrate layer, located between the first surface layer and the second surface layer;
wherein in each of the plurality of movable blades, the first surface layer and the second surface layer are located closer to a center of the light passable hole than the inner substrate layer.

2. The variable aperture module according to claim 1, wherein the rotation element comprises a plurality of rotation structures disposed corresponding to the movement holes of the plurality of movable blades, and the plurality of rotation structures are respectively movable in the movement holes so as to adjust the size of the light passable hole.

3. The variable aperture module according to claim 2, wherein each of the plurality of rotation structures is a structure of the rotation element extending along a direction parallel to the optical axis.

4. The variable aperture module according to claim 1, wherein in each of the plurality of movable blades, a corresponding one of the plurality of pressing structures is disposed at a side of the positioning hole or a side of the movement hole.

5. The variable aperture module according to claim 4, wherein each of the plurality of movable blades further has an inner surface and an outer surface at the movement hole thereof, the inner surface is located closer to the positioning hole than the outer surface, and corresponding one of the plurality of pressing structures is disposed on at least one of the inner surface and the outer surface.

6. The variable aperture module according to claim 1, wherein in each of the plurality of movable blades, corresponding one of the plurality of pressing structures is circumferentially disposed into the positioning hole or the movement hole.

7. The variable aperture module according to claim 1, wherein each of the plurality of positioning structures is a structure of the positioning element extending along a direction parallel to the optical axis.

8. The variable aperture module according to claim 1, wherein each of the plurality of movable blades and corresponding one of the plurality of pressing structures disposed thereon are made in one piece.

9. The variable aperture module according to claim 1, wherein the driving part further comprises:
a magnet; and
a coil, disposed corresponding to the magnet, wherein one of the magnet and the coil is disposed on the rotation element.

10. The variable aperture module according to claim 9, wherein the driving part further comprises a base, and the rotation element is disposed on the base along a direction parallel to the optical axis.

11. The variable aperture module according to claim 10, wherein the driving part further comprises at least two bearing members disposed between the rotation element and the base along a direction parallel to the optical axis so as to support rotational motion of the rotation element.

12. The variable aperture module according to claim 11, wherein each of the at least two bearing members has four contact points in physical contact with the rotation element or the base, and the four contact points have:
an inner contact point, located closer to the optical axis than other contact points of the four contact points;
an outer contact point, located farther away from the optical axis than other contact points of the four contact points;
an upper contact point, being one of two contact points that are most spaced apart from each other in a direction parallel to the optical axis among the four contact points; and
a lower contact point, being another one of the two contact points that are most spaced apart from each other in the direction parallel to the optical axis among the four contact points.

13. The variable aperture module according to claim 12, wherein a number of the at least two bearing members is five or less.

14. The variable aperture module according to claim 13, wherein a distance perpendicular to the optical axis between the inner contact point and the outer contact point is Dt, a distance perpendicular to the optical axis between the inner contact point and the lower contact point is Di, and the following condition is satisfied:

$0.3 \leq Di/Dt \leq 0.7$.

15. The variable aperture module according to claim 11, wherein each of the at least two bearing members has three contact points in physical contact with the rotation element or the base, and the three contact points have:
an inner contact point, located closer to the optical axis than other contact points of the three contact points;
an outer contact point, located farther away from the optical axis than other contact points of the three contact points;
an upper contact point, being one of two contact points that are most spaced apart from each other in a direction parallel to the optical axis among the three contact points; and
a lower contact point, being another one of the two contact points that are most spaced apart from each other in the direction parallel to the optical axis among the three contact points;
wherein one of the inner contact point and the outer contact point and one of the upper contact point and the lower contact point among the three contact points are a same contact point.

16. The variable aperture module according to claim 15, wherein a number of the at least two bearing members is five or less.

17. The variable aperture module according to claim 16, wherein a distance perpendicular to the optical axis between the inner contact point and the outer contact point is Dt, a distance perpendicular to the optical axis between the inner contact point and a remaining contact point among the three contact points is Di, and the following condition is satisfied:

$0.3 \leq Di/Dt \leq 0.7$.

18. The variable aperture module according to claim 9, wherein the driving part further comprises at least two bearing members disposed between the rotation element and the positioning element along a direction parallel to the optical axis so as to support rotational motion of the rotation element.

19. An imaging lens module, comprising:
the variable aperture module of claim 1; and
an imaging lens, wherein the variable aperture module and the imaging lens are sequentially disposed along the optical axis from an object side to an image side, and light enters into the imaging lens via the light passable hole of the variable aperture module.

20. The imaging lens module according to claim 19, wherein the imaging lens has an f-number, the f-number is FNO, and the following condition is satisfied:

$0.9 \leq FNO \leq 5.6$.

21. The imaging lens module according to claim 19, wherein the imaging lens has a maximum field of view, the maximum field of view is FOV, and the following condition is satisfied:

50 [deg.] $\leq FOV \leq$ 105 [deg.].

22. An electronic device, comprising:
the imaging lens module of claim 19.

* * * * *